(12) United States Patent
Ryan et al.

(10) Patent No.: US 10,136,664 B2
(45) Date of Patent: Nov. 27, 2018

(54) POPCORN POPPING MACHINES AND METHODS FOR DIFFERENT TYPES OF POPCORN KERNELS AND DIFFERENT POPPED POPCORN TYPES

(71) Applicant: Gold Medal Products Company, Cincinnati, OH (US)

(72) Inventors: John J. Ryan, Independence, KY (US); Brian A. Whiting, Bellbrook, OH (US)

(73) Assignee: Gold Medal Products Company, Cincinnati, OH (US)

( * ) Notice: Subject to any disclaimer, the term of this patent is extended or adjusted under 35 U.S.C. 154(b) by 212 days.

(21) Appl. No.: 15/206,852

(22) Filed: Jul. 11, 2016

(65) Prior Publication Data
US 2018/0007940 A1 Jan. 11, 2018

(51) Int. Cl.
| A23L 7/187 | (2016.01) |
| A23P 20/10 | (2016.01) |
| A23G 3/20  | (2006.01) |
| A23L 7/191 | (2016.01) |
| A23G 3/34  | (2006.01) |
| A23P 30/38 | (2016.01) |
| A23L 7/174 | (2016.01) |

(52) U.S. Cl.
CPC ............ *A23L 7/187* (2016.08); *A23G 3/0063* (2013.01); *A23G 3/20* (2013.01); *A23L 7/174* (2016.08); *A23L 7/191* (2016.08); *A23P 20/10* (2016.08); *A23P 30/38* (2016.08); *A23G 2220/20* (2013.01)

(58) Field of Classification Search
CPC ... A23L 7/161–7/191; A23L 5/11–5/12; A23P 20/00–20/18; A23P 30/30–30/38; A23G 3/0085–3/0095; A23G 3/20–3/28; A23G 2220/20

USPC ........ 426/231–233, 438–440, 449–450, 523, 426/520; 99/323.5–323.11
See application file for complete search history.

(56) References Cited

U.S. PATENT DOCUMENTS

| 1,218,341 A | 3/1917  | Truitt         |
| 1,219,341 A | 3/1917  | Truitt         |
| 1,477,704 A | 12/1923 | Holcomb et al. |
| 1,508,452 A | 9/1924  | Harrington     |
| 1,545,357 A | 7/1925  | Schwimmer      |

(Continued)

FOREIGN PATENT DOCUMENTS

| CA | 682731 A   | 3/1964 |
| EP | 0364071 A2 | 4/1990 |

*Primary Examiner* — Drew E Becker
(74) *Attorney, Agent, or Firm* — Wood Herron & Evans LLP

(57) ABSTRACT

A method and popping machine for popping different types of popcorn kernels is provided, where the different types of popcorn kernels include at least mushroom type popcorn and butterfly type popcorn. The method includes determining a selected one of the different types of popcorn kernels to be popped in a first popping cycle based upon a selection made by an operator, and then retrieving and using a first set of predetermined cooking temperature set points associated with cooking the selected one of the different types of popcorn kernels during performance of the first popping cycle. The cooking temperature set points determine several items which may include when to heat a kettle of the popping machine, when to signal an operator to take action such as loading kernels or dumping popped popcorn, and when to add sugar if a sweetened popped popcorn type is desired.

20 Claims, 7 Drawing Sheets

(56) References Cited

U.S. PATENT DOCUMENTS

| | | |
|---|---|---|
| 1,704,133 A | 3/1929 | LeClaire |
| 1,705,702 A | 3/1929 | Backer |
| 1,715,692 A | 6/1929 | Backer |
| 1,786,877 A | 12/1930 | Thompson |
| 1,789,902 A | 1/1931 | Jackson |
| 1,813,767 A | 7/1931 | Reichart |
| 1,826,948 A | 10/1931 | Nelson |
| 1,977,831 A | 10/1934 | Marshall et al. |
| 2,017,293 A | 10/1935 | Priest |
| 2,027,698 A | 1/1936 | Parks et al. |
| 2,034,484 A | 3/1936 | Pagedarm |
| 2,070,498 A | 2/1937 | Tournier |
| 2,120,718 A | 6/1938 | Smith |
| 2,123,663 A | 7/1938 | Roach |
| 2,134,682 A | 11/1938 | Burch |
| 2,189,127 A | 2/1940 | Brannon |
| 2,207,876 A | 7/1940 | Sandell |
| 2,230,460 A | 2/1941 | Kleinwachter |
| 2,232,954 A | 2/1941 | Manley |
| 2,248,812 A | 7/1941 | Cretors |
| 2,254,271 A | 9/1941 | Cretors |
| 2,427,945 A | 9/1947 | Clark et al. |
| 2,458,190 A | 1/1949 | Newburger |
| 2,505,967 A | 5/1950 | Humphrey |
| 2,529,877 A | 11/1950 | Ladge |
| 2,536,298 A | 1/1951 | Manley |
| 2,537,744 A | 1/1951 | Cretors |
| 2,549,449 A | 4/1951 | Gibson |
| 2,575,643 A | 11/1951 | Tamsen |
| 2,586,347 A | 2/1952 | Kloster |
| 2,646,189 A | 7/1953 | Wickesberg |
| 2,654,823 A | 10/1953 | Altemiller |
| 2,695,947 A | 11/1954 | Heerdt |
| 2,727,798 A | 3/1955 | Nakamura |
| 2,712,055 A | 6/1955 | Campbell |
| 2,743,633 A | 5/1956 | Powell |
| 2,729,953 A | 6/1956 | Cretors |
| 2,812,704 A | 11/1957 | Hawks |
| 2,848,937 A | 8/1958 | Martin |
| 2,856,841 A | 10/1958 | Cretors et al. |
| 2,859,015 A | 11/1958 | Spangler |
| 2,907,264 A | 10/1959 | Bushway |
| 2,939,379 A | 6/1960 | Schmitt |
| 2,972,292 A | 2/1961 | Waas et al. |
| 2,984,169 A | 5/1961 | Bushway |
| 3,010,006 A | 11/1961 | Schwaneke |
| 3,031,735 A | 5/1962 | Jepson |
| 3,064,112 A | 11/1962 | Hanzel |
| 3,082,313 A | 3/1963 | Jepson et al. |
| 3,095,326 A | 6/1963 | Green et al. |
| 3,095,498 A | 6/1963 | Foster |
| 3,102,032 A | 8/1963 | Lippert |
| 3,120,168 A | 2/1964 | Lippert |
| 3,197,076 A | 7/1965 | Chamblee |
| 3,223,291 A | 12/1965 | Thomas |
| 3,253,532 A | 5/1966 | Jones |
| 3,253,747 A | 5/1966 | Thomas |
| 3,254,800 A | 6/1966 | Baunach |
| 3,282,470 A | 11/1966 | Thomas |
| 3,294,039 A * | 12/1966 | Ogden .................. A23G 3/26 118/20 |
| 3,294,546 A | 12/1966 | Fingerhut |
| 3,321,107 A | 5/1967 | Govin et al. |
| 3,384,195 A | 5/1968 | Jepson et al. |
| 3,487,200 A | 12/1969 | Vello et al. |
| 3,512,989 A | 5/1970 | Smith |
| 3,554,115 A | 1/1971 | Manley et al. |
| 3,584,586 A | 6/1971 | Manley et al. |
| 3,593,652 A | 7/1971 | Lostanlen |
| 3,606,828 A | 9/1971 | Smith |
| 3,641,916 A | 2/1972 | McDevitt et al. |
| 3,645,422 A | 2/1972 | Cretors |
| 3,697,289 A | 10/1972 | Day et al. |
| 3,715,567 A | 2/1973 | Mandziak |
| 3,722,399 A | 3/1973 | Cole |
| 3,739,148 A | 6/1973 | Ryckman, Jr. |
| 3,739,953 A | 6/1973 | Cretors |
| 3,783,820 A | 1/1974 | Hautly et al. |
| 3,787,594 A | 1/1974 | Palmason |
| 3,798,415 A | 3/1974 | Graham |
| 3,812,774 A | 5/1974 | Day et al. |
| 3,930,966 A | 1/1976 | Takahashi et al. |
| 3,934,118 A | 1/1976 | Jorgenson et al. |
| 4,068,572 A | 1/1978 | Vogt |
| 4,094,446 A | 6/1978 | Brutsman |
| 4,115,918 A | 9/1978 | Anderl et al. |
| 4,120,236 A | 10/1978 | Blomberg |
| 4,133,456 A | 1/1979 | Corini |
| 4,149,455 A | 4/1979 | Ross |
| 4,171,066 A | 10/1979 | Hirose |
| 4,171,667 A | 10/1979 | Miller et al. |
| 4,178,843 A | 12/1979 | Crabtree et al. |
| 4,182,229 A | 1/1980 | VandeWalker |
| 4,203,357 A | 5/1980 | Vaussanvin |
| 4,206,695 A | 6/1980 | Cretors |
| 4,243,874 A | 1/1981 | Fischer |
| 4,268,741 A | 5/1981 | O'Brien |
| 4,270,067 A | 5/1981 | Thomas et al. |
| 4,286,377 A | 9/1981 | Hurko et al. |
| 4,288,686 A | 9/1981 | Cretors |
| 4,307,287 A | 12/1981 | Weiss |
| 4,307,657 A | 12/1981 | Avery |
| 4,310,748 A | 1/1982 | Paulin |
| 4,350,875 A | 9/1982 | McWilliams |
| 4,372,354 A | 2/1983 | Moore |
| 4,388,520 A | 6/1983 | McWilliams |
| 4,397,874 A | 8/1983 | Piotrowski |
| 4,421,146 A | 12/1983 | Bond et al. |
| 4,426,923 A | 1/1984 | Ohata |
| 4,438,682 A | 3/1984 | King et al. |
| 4,458,139 A | 7/1984 | McClean |
| 4,477,003 A | 10/1984 | Baker et al. |
| 4,484,697 A | 11/1984 | Fry, Jr. |
| 4,492,853 A | 1/1985 | Lam |
| 4,494,314 A | 1/1985 | Gell, Jr. |
| 4,557,399 A | 12/1985 | Redick, Jr. |
| 4,582,713 A | 4/1986 | Hirokawa et al. |
| 4,584,586 A | 4/1986 | Kocsi |
| 4,611,112 A | 9/1986 | Schreder |
| 4,632,275 A | 12/1986 | Parks |
| 4,649,263 A | 3/1987 | Goodlaxson |
| 4,723,688 A | 2/1988 | Munoz |
| 4,727,798 A | 3/1988 | Nakamura |
| 4,735,135 A | 4/1988 | Walker |
| 4,763,568 A | 8/1988 | Kiczek |
| 4,850,120 A | 7/1989 | Stein |
| 4,855,572 A | 8/1989 | Wallgren et al. |
| 4,919,308 A | 4/1990 | Majkrzak |
| 5,020,688 A | 6/1991 | Power |
| 5,026,969 A | 6/1991 | Knepler et al. |
| 5,033,363 A * | 7/1991 | King .................. A23L 7/183 426/233 |
| 5,035,173 A | 7/1991 | Stein et al. |
| 5,114,045 A | 5/1992 | Herpe |
| 5,121,857 A | 6/1992 | Hutchinson |
| 5,212,857 A | 5/1993 | McMurtry |
| 5,301,601 A | 4/1994 | Cretors |
| 5,309,825 A | 5/1994 | Pinone |
| 5,363,748 A | 11/1994 | Boehm et al. |
| 5,396,047 A | 3/1995 | Schilling et al. |
| 5,397,219 A | 3/1995 | Cretors |
| 5,404,797 A | 4/1995 | Millar |
| 5,522,308 A | 6/1996 | Kayashima et al. |
| 5,555,792 A | 9/1996 | Stein et al. |
| 5,582,755 A | 12/1996 | Maher, Jr. et al. |
| 5,590,582 A | 1/1997 | Weiss |
| 5,643,485 A | 7/1997 | Potter et al. |
| 5,657,684 A | 8/1997 | Chaikowsky |
| 5,660,869 A | 8/1997 | Weiss |
| 5,662,024 A | 9/1997 | Cretors et al. |
| 5,694,830 A | 12/1997 | Hodgson et al. |
| 5,743,172 A | 4/1998 | Weiss et al. |
| 5,771,779 A | 6/1998 | Stein et al. |
| 5,841,108 A | 11/1998 | Lacombe |

(56) References Cited

U.S. PATENT DOCUMENTS

| | | | |
|---|---|---|---|
| 5,871,792 A | 2/1999 | Weiss et al. | |
| 5,885,641 A | 3/1999 | Hodgson et al. | |
| 5,925,393 A | 7/1999 | Stein et al. | |
| 6,000,318 A * | 12/1999 | Weiss | G07F 17/0078 99/323.5 |
| 6,040,562 A | 3/2000 | Tokumoto et al. | |
| 6,092,458 A | 7/2000 | Weiss et al. | |
| 6,098,526 A | 8/2000 | Stein | |
| 6,135,011 A | 10/2000 | Hodgson et al. | |
| 6,164,193 A | 12/2000 | Perttola | |
| 6,234,063 B1 * | 5/2001 | Evers | G07F 17/0078 99/323.7 |
| 6,234,064 B1 * | 5/2001 | Turrel | A47J 27/14 99/323.11 |
| 6,352,731 B1 * | 3/2002 | Weiss | G07F 17/0078 426/233 |
| 6,354,191 B1 | 3/2002 | Weiss et al. | |
| 6,412,395 B1 | 7/2002 | Weiss et al. | |
| 6,486,446 B1 | 11/2002 | Kao | |
| 6,534,103 B2 | 3/2003 | Weiss | |
| 6,555,793 B2 | 4/2003 | Griffiths et al. | |
| 6,672,201 B2 | 1/2004 | Evans, Sr. et al. | |
| 6,726,945 B2 | 4/2004 | Weiss | |
| 6,829,982 B2 | 12/2004 | Weiss et al. | |
| 7,208,703 B2 | 4/2007 | Shimatani et al. | |
| 7,573,003 B2 | 8/2009 | Gratz et al. | |
| 8,216,622 B2 | 7/2012 | Evans, Sr. et al. | |
| 9,320,293 B2 | 4/2016 | Weiss | |
| 2001/0003335 A1 | 6/2001 | Griffiths et al. | |
| 2001/0050005 A1 | 12/2001 | Wang | |
| 2003/0159591 A1 * | 8/2003 | Evans, Sr. | A23L 7/187 99/323.5 |
| 2004/0074397 A1 * | 4/2004 | Calhoun | A23L 7/187 99/323.5 |
| 2004/0178187 A1 | 9/2004 | McWilliams | |
| 2004/0245240 A1 * | 12/2004 | Cretors | H05B 1/0252 219/494 |
| 2005/0172829 A1 | 8/2005 | Shimatani et al. | |
| 2005/0274710 A1 | 12/2005 | Toyos et al. | |
| 2006/0219709 A1 | 10/2006 | Kagan | |
| 2007/0056448 A1 | 3/2007 | Kernan | |
| 2007/0084853 A1 | 4/2007 | Shingler | |
| 2009/0126579 A1 * | 5/2009 | Cretors | A23L 7/161 99/323.11 |
| 2013/0276641 A1 * | 10/2013 | Vidojevic | A23L 7/187 99/323.5 |
| 2013/0280386 A1 * | 10/2013 | Cretors | A23L 1/1812 426/233 |
| 2014/0076174 A1 | 3/2014 | Vernaglia et al. | |
| 2015/0064320 A1 * | 3/2015 | Cretors | A23G 3/26 426/307 |
| 2016/0249657 A1 * | 9/2016 | Cherney | A23L 7/187 426/233 |
| 2018/0168206 A1 * | 6/2018 | Cretors | A23L 7/183 |

* cited by examiner

POPCORN POPPING MACHINES AND METHODS FOR DIFFERENT TYPES OF POPCORN KERNELS AND DIFFERENT POPPED POPCORN TYPES

TECHNICAL FIELD

This invention relates to popcorn popping machines and methods of popping popcorn, including popping in consecutive batches while producing a consistently high quality of popped popcorn, regardless of the type of popcorn cooked by the popcorn popping machines and methods.

BACKGROUND

Popcorn is mass-produced for sale at movies and other events in commercial popcorn poppers which typically include an enclosed, transparent cabinet containing a tiltable kettle suspended above a catch area or platform. The kettle is heated and uncooked popcorn kernels are placed therein to be cooked and popped. Once the kernels are popped, the kettle is manually or automatically tilted and the popped popcorn spills onto the platform to be scooped up, packaged, and sold to customers.

This process can be highly labor-intensive for an operator of the popping machine, especially when consecutive batches of popcorn need to be cooked by the popping machine. For example, in conventional systems the operator must remain at the machine to monitor cooking progress and take actions such as loading of kernels or dumping of popped popcorn during a popping cycle, in order to assure that the popcorn in each batch is cooked consistently so as to provide high quality optimal taste from batch to batch. Conventional systems often rely on the experience of the operator to time actions correctly, which can lead to undercooking or burning of popcorn when the popping cycle is not carried out correctly. These problems with conventional systems and methods become even more exacerbated when producing a more complicated popped popcorn like sweetened popcorn.

The type of popcorn which most often tends to be mass-produced and sold is made from a type of popcorn kernel known as traditional "butterfly" type popcorn. When popped, such butterfly type popcorn takes the form of a highly irregular shape, with extending tendrils, which may be easily broken off when agitated or tumbled. In the popcorn industry, it is known to provide a variety of methods and apparatus for optimizing the popping of traditional butterfly type popcorn. For example, popping of traditional butterfly type popcorn is believed to be optimized in a time period of about 3 minutes (or longer, such as in versions requiring a sweetened coating) and at kettle temperatures approaching about 400° F. Of course, specific parameters and time or temperature set points can vary based on the desires of a particular operator or end product (popped popcorn).

In view of the largely prolific nature of butterfly type popcorn in the popcorn industry, numerous apparatus and methods for popping butterfly type popcorn have been developed as set forth above. To this end, several types of butterfly type popcorn popping machines and methods developed by the assignee of the present application are disclosed, for example, in numerous issued U.S. Patents including U.S. Pat. No. 6,352,731 to Weiss; U.S. Pat. No. 6,534,103 to Weiss; U.S. Pat. No. 6,726,945 to Weiss; U.S. Pat. No. 6,829,982 to Weiss et al.; U.S. Pat. No. 8,216,622 to Evans, Sr. et al.; and U.S. Pat. No. 5,590,582 to Weiss, all of which are expressly incorporated herein by reference in their entireties. The U.S. Pat. No. 6,534,103 specifically discloses an apparatus for popping butterfly type popcorn in a typical process for "salt" popcorn and in a different temperature controlled process where the popcorn is to be "sweet" by being coated with a "sweet" coating such as sugar. In this regard, it is known from this reference that different cooking times and temperature parameters may be desirable and selected by an operator depending on the type of coating applied to the popped popcorn. However, these machines and methods still rely heavily on the operator for appropriate management of actions such as when to load the kernels, oil, and seasoning into the kettle and when to dump the popped popcorn when a popping cycle is completed.

More recently, a different type of popcorn kernel known as "mushroom" type popcorn has become popular for use and sale in the popcorn industry. The mushroom type popcorn differs in appearance, content and performance when compared to butterfly type popcorn.

More particularly respecting appearance, the popped mushroom type popcorn has a relatively smoother surface and therefore forms fewer crevices than butterfly popcorn. This allows the mushroom type popcorn to be tumbled for effective coating purposes without risking tendril-like portions (often formed on butterfly type popcorn) from breaking off during the tumbling process. Also, mushroom type popcorn, when prepared as a popped popcorn, is believed to have more gelatin content, which is not so melted as the gelatin in butterfly type popcorn according to the understanding of the inventor of this application, making popped mushroom type popcorn generally chewier than the less gelatinous popped butterfly type popcorn. The melting and/or explosion of the gelatin in butterfly type popcorn may be one factor that contributes to forming the irregular shape of the butterfly type popcorn, producing its less gelatinous and less chewy nature in the popped corn state than for mushroom type popcorn. In this regard, mushroom type popcorn should be cooked using a different set of cooking temperature and time parameters based on these differentiating factors to result in optimal and desirable popped popcorn.

In other words, it has been discovered that subjecting mushroom type popcorn to cooking temperatures and times associated with popping butterfly type popcorn tends to ruin mushroom type popcorn by melting more gelatin and causing the kernels to explosively expand, producing tendrils, irregular shapes and a more brittle product than desired with mushroom type popcorn. Such irregular shapes can also be less desirable for coating popped popcorn, both because of the risk of breaking off tendrils when popcorn is shaped irregularly and because there may be less surface area to pick up and retain the coating. Non-optimal cooking times and temperatures applied to mushroom popcorn may also cause less expansion of the popcorn when popped, which is not as desirable for coating. Likewise, subjecting butterfly type popcorn kernels to cooking temperatures and times appropriate for mushroom type popcorn will result in not optimal cooking and popping of the butterfly type popcorn. Particularly in environments where multiple types of popcorn may be desired in different cooking batches (e.g., a retail popcorn setting), with optional alternating sweet and salt coatings as well, there is no currently known popping machine or method for handling these variations.

Accordingly, it would be desirable to provide a popping machine and method for cooking different types of popcorn kernels, including mushroom type popcorn and butterfly type popcorn, to the optimal specifications desired for each. Moreover, it would also be desirable to provide operators with accurate prompts to help run the machine in different operating modes, including those requiring addition of sugar or a sweetened coating at a specific time when those components will not burn in the kettle.

SUMMARY

In accordance with one aspect of the invention, a method is provided for popping different types of popcorn kernels in a kettle of a popping machine, which includes a controller communicating with a user interface and a heat sensor responsive to a temperature of the kettle. The method includes determining a selected one of the different types of popcorn kernels to be popped in a first batch of kernels during a first popping cycle to produce a first popped popcorn type, based upon a selection made by an operator at the user interface. A first set of predetermined cooking temperature set points is then retrieved which is associated with cooking the selected one of the different types of popcorn kernels in the first batch of kernels. The first set of predetermined temperature set points includes at least a load point temperature and a dump point temperature, with the first set of predetermined temperature set points being one of a plurality of stored sets of predetermined temperature set points stored for and associated with different types of popcorn kernels. The method further includes heating the kettle to the load point temperature, and alerting the operator to load the first batch of kernels into the kettle to begin the first popping cycle when the kettle reaches the load point temperature, as measured by the heat sensor. Following the loading of kernels (and cooking oil), the kettle is heated to the dump point temperature to cook the first batch of kernels to generate popped popcorn of the first popped popcorn type, and then a prompt is provided for the popped popcorn to be dumped from the kettle when the kettle reaches the dump point temperature, as measured by the heat sensor. The different types of popcorn kernels may include at least a mushroom type popcorn and a butterfly type popcorn, thereby enabling multiple types of popcorn kernels to be cooked in a desirable manner.

In some embodiments, the alerting of the operator at the load point temperature and the prompting at the dump point temperature are performed by providing at least one of an audible alarm and an illumination of an indicator light (such as an LED or an indicator screen) to identify the loading or dumping action required by the operator. It will be understood that in embodiments of the method using automated kettle dump, the prompting at the dump point temperature may not include operator alarms because the popped popcorn will be dumped automatically.

In addition to determining what type of popcorn kernel is to be popped, it is also determined, based upon a selection made by the operator at the user interface, whether a sweet mode is active for the first popping cycle. If a sweet mode is active such that the first popped popcorn type is to include a sweetened coating, the first set of predetermined set points which is retrieved also includes a sweet point temperature defining when the sugar is to be added during the first popping cycle when the sweet mode is active. When the sweet mode is active, the method also includes detecting when the kettle falls below the sweet point temperature as a result of cooling of the kettle caused by loading the first batch of kernels into the kettle, and alerting the operator to load the sugar into the kettle when the kettle falls below the sweet point temperature, so as to avoid burning the sugar in the kettle during the first popping cycle.

In other embodiments, the first set of predetermined temperature set points retrieved for the first popping cycle further includes a cold point temperature defining a threshold for determining whether the kettle was cold at an initial power up of the popping machine, a coast point temperature defining a threshold for turning off heat energy to the kettle as the kettle approaches the load point temperature after starting from a cold kettle, a set point temperature defining a temperature that is to be maintained at the kettle such as between popping cycles, and a sweet point temperature defining when to add sugar to the kettle when a sweet mode is active. It will be understood that some or all of the predetermined temperature set points may instead be defined by times (associated with specific temperatures according to a cooking cycle temperature over time plot) for taking each of the necessary actions such as loading and dumping from the kettle, in other embodiments consistent with the scope of this disclosure. An offset calibration mode or a regular run mode may be selected by an operator at the user interface during the initial power up of the popping machine. When the offset calibration mode is selected, the method includes detecting a current operating mode of the popping machine based on the selected one of the different types of popcorn kernels, and adjusting each of a dump offset and a sweet offset based on input from the operator at the user interface. The dump offset is added to the dump point temperature for the current operating mode, while the sweet offset is added to the sweet point temperature for the current operating mode. These offsets enable operator adjustments to the dump point temperature and the sweet point temperature of the currently selected operating mode based on operator preferences.

During the normal operation or "run mode" of the popping machine, the controller of the popping machine performs a kettle heat routine to determine whether to supply heat energy to the kettle at about every 1 second following the initial power up. The kettle heat routine further includes determining whether the kettle is cold at the initial power up of the popping machine (determined by the cold point temperature), and if the kettle was cold, the kettle is heated to the coast point temperature. The heat energy is turned off at the coast point temperature to allow a continued rise of kettle temperature to about the load point temperature, so as to minimize overshoot beyond the load point temperature. Alternatively, if the kettle was not determined to be cold at initial power up, the heat energy is applied to the kettle when the kettle is below the set point temperature, and the heat energy is not applied to the kettle when the kettle is above the set point temperature.

Also during the normal operation or "run mode" of the popping machine, the controller of the popping machine performs an alarm routine to determine whether any alarms for the operator should be activated or deactivated at about every 1 second following an initial power up. The alarm routine begins by determining whether the popping machine is in a load alarm mode or a dump alarm mode. When in the load alarm mode, the controller activates a load alarm to alert the operator to load the first batch of kernels into the kettle if the kettle is above the load point temperature, and then deactivates the load alarm when the kettle falls 15° F. below the load point temperature. When in the dump alarm mode, the controller activates a dump alarm to alert the operator to dump popped popcorn from the kettle if the kettle is above the dump point temperature, and then deactivates the dump alarm after 10 seconds have passed following activation of the dump alarm. Each of the dump alarm and the load alarm includes at least one of an audible alarm and illumination of an indicator light on the user interface.

The load alarm mode includes additional functionality and features as follows. The controller, in the load alarm mode, starts a dump block timer when the load alarm is deactivated. The dump block timer defines a period of time in which the alarm routine remains in the load alarm mode before returning to the dump alarm mode, thereby allowing for a period of time to cook the first batch of kernels in the kettle. When the dump block timer is running and a sweet mode is active, the controller determines when the kettle falls below the sweet point temperature. When that occurs at the kettle, the controller activates a sweet alarm to alert the operator to add sugar to the kettle when the kettle falls below the sweet point temperature, and then deactivates the sweet alarm 10 seconds after the sweet alarm was activated. Thus, an automated indication can be provided for helping an operator manage a sweet mode for popping popcorn, regardless of the different types of popcorn kernels being cooked in the popping machine.

The various popping steps described above can then be repeated for a second batch of kernels in a second popping cycle to produce a second popped popcorn type with a different type of popcorn kernel or a different type of desired popped popcorn.

In accordance with a similar aspect of the invention, a popping machine is configured to pop different types of popcorn kernels in different popping cycles. The machine includes a kettle associated with heating elements and configured to receive popcorn kernels for a popping cycle, a heat sensor responsive to a temperature of the kettle, and a storage device which stores a plurality of stored sets of predetermined cooking temperature set points, which are associated with different types of popcorn kernels to produce different types of popped popcorn types. The machine also includes a user interface which receives from an operator a selection of a current operating mode for the popping cycle, and a controller operatively connected to each of these other elements of the machine. The controller is programmed to operate the popping machine by retrieving from the storage device a first set of predetermined temperature set points associated with the current operating mode selected for the popping cycle, the first set having a load point temperature and a dump point temperature. The controller actuates heating of the kettle with the heating elements based on signals from the heat sensor indicating when the kettle reaches the load point temperature and the dump point temperature, to thereby cook kernels into popped popcorn. The controller also prompts for loading of the kernels into the kettle at the beginning of the popping cycle and for dumping of the popped popcorn from the kettle at the end of the popping cycle. The popping machine is therefore able to optimally pop different types of popcorn kernels including mushroom type popcorn and butterfly type popcorn.

In one embodiment, the popping machine further includes at least one switch at the user interface which is configured to receive selections from the operator, at least one indicator light configured to be illuminated to identify the current operating mode and/or to alert the operator when loading or dumping action is required, and at least one audible alarm which is configured to be actuated to alert the operator when loading or dumping action is required. For example, the user interface in such embodiments may include at least one switch and/or at least one indicator light for each of the following: a mode selector for identifying the current operating mode, an automated oil heating and dispensing system, the heating elements associated with the kettle, a stir drive associated with the kettle, a heat element at a service platform for receiving the popped popcorn dumped from the kettle. It will be appreciated that the kettle may be configured for manual loading of cooking oil with the kernels, or may also include an automated dump motor which removes popped popcorn from the kettle at the end of a popping cycle, without departing from the scope of the invention disclosed herein.

In accordance with yet another aspect of the invention, a method is provided for popping sweet popcorn in a kettle of a popping machine, which includes a controller communicating with a heat sensor responsive to a temperature of the kettle. The method includes retrieving a set of predetermined temperature set points associated with cooking the sweet popcorn, the set including at least a load point temperature, a sweet point temperature, and a dump point temperature. The kettle is then heated to the load point temperature, and an operator is alerted to load a batch of popcorn kernels into the kettle to begin a popping cycle when the kettle reaches the load point temperature, as measured by the heat sensor. The method further includes detecting when the kettle falls below the sweet point temperature after the batch of popcorn kernels are loaded into the kettle at the load point temperature, and alerting the operator to load sugar into the kettle when the kettle falls below the sweet point temperature, as measured by the heat sensor. The method then includes heating the kettle to the dump point temperature to cook the batch of popcorn kernels and the sugar to generate popped sweet popcorn, and prompting for the popped sweet popcorn to be dumped from the kettle when the kettle reaches the dump point temperature as measured by the heat sensor. Thus, the method advantageously operates a sweet popcorn popping cycle so as to avoid burning sugar in the kettle while forming an optimal popped sweet popcorn.

Many of the same features described above with the method for popping different types of popcorn kernels are equally applicable in this method of popping sweet popcorn. For example, the alarm routine may be provided to activate and deactivate a sweet alarm based on when the kettle falls below the load point temperature by a predetermined threshold (e.g., 15° F.) and also falls below a sweet point temperature set such that burning of sugar during the popping cycle is avoided. Likewise, the offset calibration mode for setting a sweet offset and/or a dump offset based on operator preferences may also be included in the method.

In accordance with yet another aspect of the invention, a popping machine is configured to pop sweet popcorn in a popping cycle. The machine includes a kettle associated with heating elements and configured to receive popcorn kernels and sugar for the popping cycle, a heat sensor responsive to a temperature of the kettle, and a storage device which stores a set of predetermined temperature set points, which are associated with cooking the sweet popcorn. The machine also includes a user interface, which provides signals to an operator when actions are required at the popping machine, and a controller operatively connected to each of these other elements of the machine. The controller is programmed to operate the popping machine by retrieving from the storage device the set of predetermined temperature set points associated with cooking the sweet popcorn, the set having a load point temperature, a sweet point temperature, and a dump point temperature. The controller actuates heating of the kettle with the heating elements based on signals from the heat sensor to thereby cook kernels into popped sweet popcorn. The controller also prompts for loading of the kernels into the kettle at the beginning of the popping cycle, for loading of sugar into the kettle when the kettle falls below the sweet point temperature, and for dumping of the popped popcorn from the kettle at the end of the popping cycle. The popping machine therefore advantageously avoids burning the sugar in the kettle during the popping cycle.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
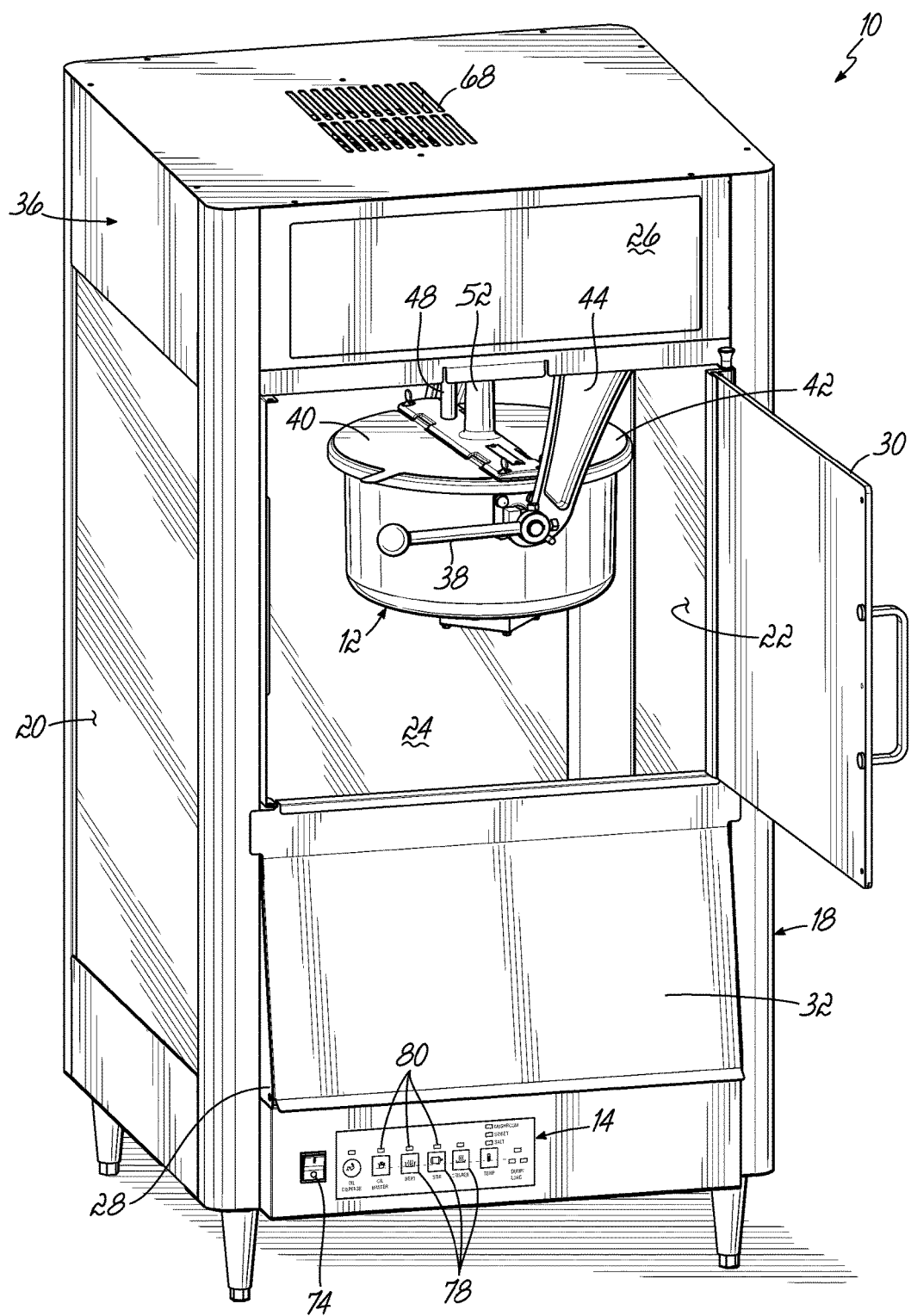
FIG. 1 is a perspective view of one embodiment of a popping machine configured to pop different types of popcorn kernels, including to produce salt and sweet popped popcorn types, utilizing the features and methodology in accordance with the invention.
Figure 2:
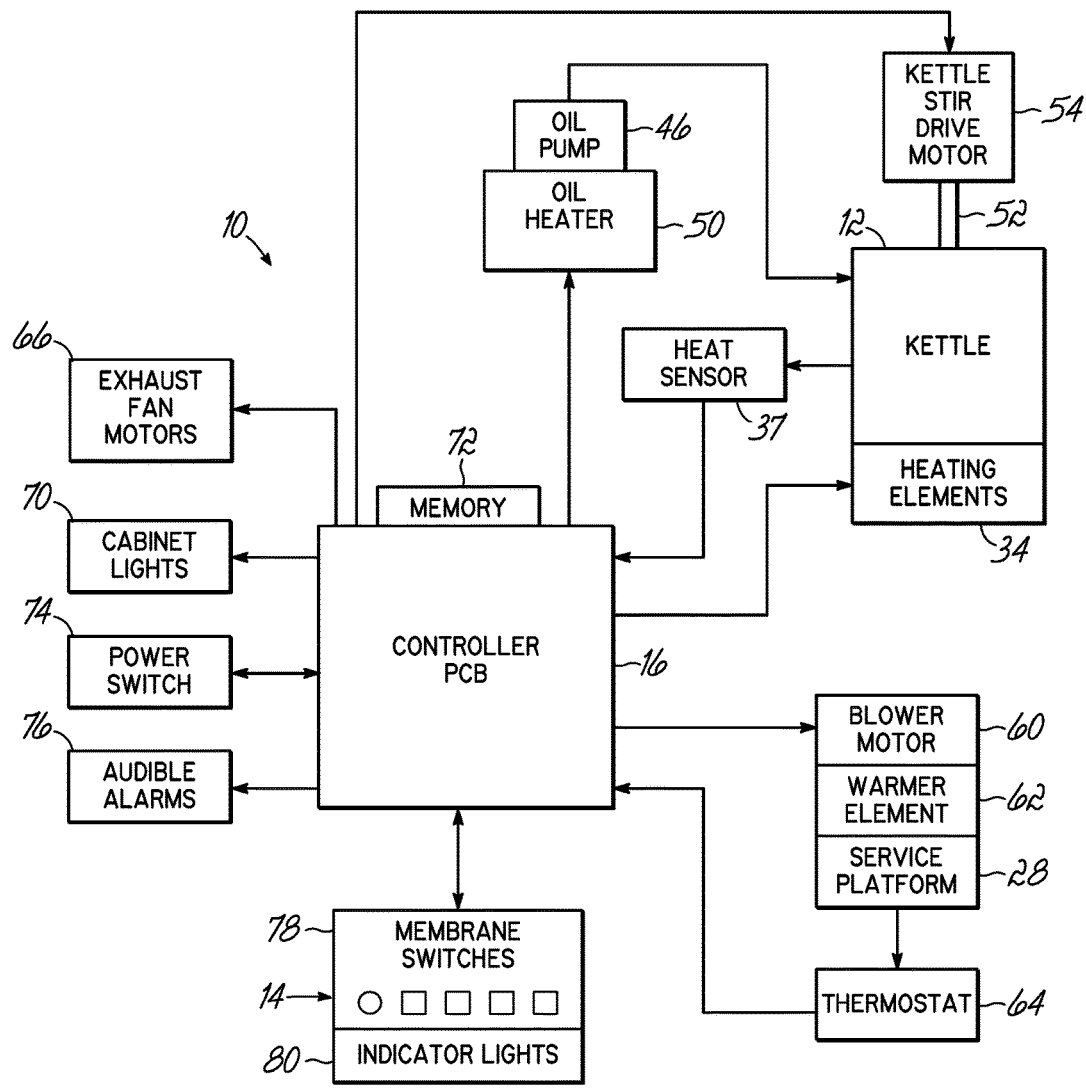
FIG. 2 is a block schematic diagram of systems and components included in the popping machine of FIG. 1.
Figure 3:
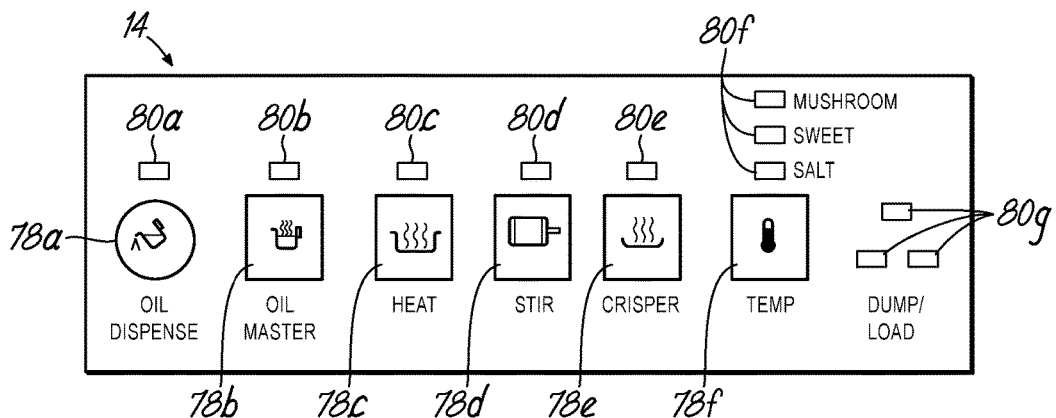
FIG. 3 is a front view of a user interface used with the popping machine of FIG. 1.

One embodiment of a popping machine 10 in accordance with the invention disclosed herein is shown at FIGS. 1 through 3, with corresponding operational flowcharts and graphical plots shown at FIGS. 4 through 7 to describe the operation and functionality thereof. The popping machine 10 is advantageously configured for popping different types of popcorn kernels, where the different types of popcorn kernels include at least mushroom type popcorn and butterfly type popcorn. To this end, and as described in further detail below, the popping machine 10 is capable of operating with different sets of predetermined cooking temperature set points associated with the different types of popcorn kernels and/or different types of popped popcorn which is to be produced in a popping cycle. As a result, the popping machine 10 can switch between different cooking operating modes and produce different types of popcorn in consecutive popping cycles, which may be desired in some retail contexts. For example, the popping machine 10 could operate in a first popping cycle to optimally cook a salt butterfly type popcorn, and then operate in a second popping cycle to optimally cook a sweet mushroom type popcorn. Furthermore, the popping machine 10 functions to provide appropriate prompts for operator action when required (such as when kernels need loaded into a kettle 12 or when popped popcorn needs dumped from the kettle 12) for different types of popcorn. Thereby making it easy for operators to produce different popped popcorn types with the popping machine 10 based on current customer demand, while ensuring that each different type of popcorn kernel is cooked optimally. As described herein, the various types of popcorn types may be butterfly, salt, butterfly sweet, mushroom salt, or mushroom sweet by way of example an without limitation.

Another related advantage is the automated prompting for sugar addition at the appropriate time during a popping cycle for producing sweet popcorn, as the popping machine 10 operates as set forth below to avoid burning the popcorn or the sweetened coating during the popping cycle(s). Thus, the popping machine 10 of this embodiment provides several functionalities advancing the art of popcorn popping as described further below.

Returning now with reference to FIGS. 1 and 2, the popping machine 10 according to one embodiment of the invention is shown in further detail. It will be appreciated that the popping machine 10 is operable to cook/pop popcorn and is particularly useful for cooking consecutive batches of popcorn for sale for use by concessionaires at movie theaters, sport events, fairs and the like. Several of the components of the popping machine 10 are well known and/or well-established based on prior popper designs, but these elements are described briefly below for general context along with new or revised elements of this design including a user interface 14 and a controller 16. The kettle 12 of this embodiment of the popping machine 10 is sized to receive a 16 ounce load of popcorn kernels for a cooking/popping cycle, but it will be appreciated that different sizes and configurations of kettles 12 are also possible within the scope of this disclosure (such different kettles would require different cooking temperature profiles and different set points for the corresponding cooking programming, however).

As shown best in FIG. 1, the popping machine 10 includes a cabinet 18 including two sidewalls 20, 22, a rear wall 24, front wall 26, and a service platform 28 for catching popped popcorn. Front wall 26 includes two doors 30, 32, which can be opened to gain access, both to the popped popcorn on the platform 28 and to access the kettle 12 positioned in an interior space enclosed by the cabinet 18. The sidewalls 20, 22 and rear wall 24, as well as the front wall 26 including the doors 30, 32, are all made preferably of transparent glass or plastic material so that the interior of the cabinet 18 can be viewed from the exterior. The cabinet 18 may also include various operating switches and light indicators located on an operating panel positioned along the front wall 26 and defining the user interface 14 described in further detail below. It will be understood that the positioning and size of the doors 30, 32 and the position of the user interface 14 may be modified in other embodiments without departing from the scope of this invention.

The kettle 12 of the popping machine 10 in this embodiment is of any suitable variety having heating elements 34 (not shown in FIG. 1) interconnected by a control line to a power plug mounted inside a top portion 36 of the cabinet 18. The control line is configured to also transfer operation signals from the controller 16 to the heating elements 34 to control the temperature of the kettle 12 in accordance with the operational flowcharts and methods described below. Although not visible in the perspective view of FIG. 1, the popping machine 10 includes a heat sensor 37 or temperature sensor which measures and/or is responsive to the temperature of the kettle 12. This heat sensor 37 is operatively connected to the controller 16 such that appropriate control signals can be forwarded by the controller 16 to the heating elements 34 to heat the kettle 12 as needed during and between popping cycles. The heat sensor 37 may be any known type of probe or sensor effective for accurate measurement of kettle temperatures, including designs that mount to the kettle itself and other types of sensors.

It will be appreciated that the kettle 12 is tiltable about a tilt axis defined through a connection point of a tilt handle 38 to the kettle 12. To this end, an operator can rotate the kettle 12 between the upright cooking position shown in FIG. 1 and a tilted dumping position (not shown) by rotating the tilt handle 38 about the tilt axis, such as when popped popcorn needs to be dumped from the kettle 12 at the end of a popping cycle. The kettle 12 further includes covers 40, 42 which are pivotally mounted on the kettle 12. When the popcorn is popped, it may push these covers 40, 42 open such that the popped popcorn falls out the sides of the kettle 12 onto platform 28. Moreover, it will be appreciated that one of the covers 40 is located over a so-called "dump section" or side of the kettle 12. When the kettle 12 is tilted as described above, this cover 40 pivots open to facilitate dumping of popped popcorn onto platform 28. In other embodiments not illustrated, the manually-operated tilt handle 38 may be replaced by or accompanied by an automated dump motor and drive system connected to the kettle, as described in the U.S. Pat. No. 6,726,945 to Weiss, initially referenced above.

The kettle 12 shown in this embodiment is mounted in the cabinet 18 of the popping machine 10 by way of a hanger bracket 44. The hanger bracket 44 includes an L-shaped bracket having a foot (not shown in FIG. 1) for interconnection to the top portion 36 of the cabinet 18. The remainder of the L-shaped hangar bracket 44 extends between one side of the kettle 12 and the top portion 36 of the cabinet 18. It will be understood that multiple brackets or other types of coupling mechanisms may be used to position the kettle 12 in the appropriate position within the interior of the cabinet 18 in other embodiments without departing from the scope of this invention.

The popping machine 10 of FIG. 1 also optionally includes an oil pump system 46 (shown schematically in FIG. 2) for automatically dispensing cooking oil into the kettle 12 at the beginning of a popping cycle, and/or upon receiving a prompt by an operator at the user interface 14. The oil pump system 46 may be located in various positions within the cabinet 18, such as in the top portion 36. To this end, positioned between the covers 40, 42 of kettle 12 is an oil funnel 48, of which only the bottom portion is visible in FIG. 1, and which has a flared mouth aligned with an outlet of the oil pump system 46 when the kettle 12 is upright as shown in FIG. 1. Thus, the cooking oil is pumped by the oil pump system 46 to drain into the oil funnel 48 and kettle 12 for use during a popping cycle. The oil pump system 46 may be one of various different known systems. For example, Gold Medal Products Co. of Cincinnati, Ohio, which is the owner/assignee of the present patent application, markets the Model 2114 Accumeter Bucket Pump for pumping popcorn oil. Another system, Model 2257 Rack Oil Delivery System, is also available from Gold Medal Products and is discussed in U.S. Pat. No. 5,590,582 to Weiss, initially referenced above. While those oil systems manufactured by Gold Medal Products Co. are preferable, the present invention might be utilized with other automated oil delivery systems as well. Likewise, the oil pump system 46 and its associated oil heater 50 may be removed in other typical embodiments of this invention where manual addition of oil is performed by an operator when popcorn kernels are placed in the kettle 12 at the beginning of a popping cycle. The oil pump system 46 and the oil heater 50 may be controlled or activated by one or more switches on the user interface 14 or automatically by the controller 16 as set forth below.

As will be readily understood (and as described in other prior patents of the assignee including U.S. Pat. No. 6,726,945 to Weiss, initially referenced above), the kettle 12 of this embodiment also includes an internal agitator, such as a stir blade or rotor (not shown) driven by a rotor drive train 52 extending upwardly between the covers 40, 42 to a kettle drive stir motor 54 (FIG. 2) that may be mounted within the top portion 36 of the cabinet 18. The rotor drive train 52 may include multiple gears and/or drive shafts that come into operative engagement with one another in the kettle upright position of FIG. 1 so that the stir blade or rotor can be driven within the kettle 12 to promote popping and to help avoid uneven heating or burning of components loaded inside the kettle 12. The stir motor 54 may be operatively connected to and activated by an appropriate operating switch on the user interface 14 or by the controller 16, as discussed below. Moreover, as described in the Weiss '945 patent, the stir blade may also be weighted so that it automatically moves out of the way of popped popcorn being dumped out of the kettle 12 when the kettle 12 is tilted at the end of a popping cycle.

Additional components of the popping machine 10 are shown schematically in FIG. 2. To this end, the controller 16 is shown as a printed circuit board (PCB) operatively connected to each of the various components described above at the cabinet 18. It will be understood that the controller 16 may also be defined by a programmable logic controller (PLC) or another similar control device well known for use in operating components of popcorn popping machines. As set forth above, the controller 16 is connected to each of the heating elements 34 associated with the kettle 12, the heat sensor 37, the oil pump system 46 and oil heater 50, and the kettle stir drive motor 54. Consequently, the controller 16 functions to operate each of these components (when present) in accordance with the advantageous operational flowcharts described below for producing popping of different types of popcorn kernels and different popped popcorn types as well.

The controller 16 is also operatively coupled to a blower motor 60 and heat element 62 associated with the service platform 28 where popped popcorn is dumped following a popping cycle. The blower motor 60 and heat element 62 are utilized in conjunction with each other to provide heat energy to the platform 28 to thereby maintain the popped popcorn in a crisp and fresh state prior to serving. The controller 16 may also communicate with a thermostat 64 which is responsive to the temperature at the platform 28 and/or receives control information from an operator on what the temperature should be at the platform 28. In this regard, the controller 16 uses signals from the thermostat 64 to control operation of the blower motor 60 and the heat element 62 as understood in the popcorn popping machine field.

As described above, several heat generating components such as the oil pump system 46 and the kettle stir drive motor 54 may be located in the top portion 36 of the cabinet 18. As such, to cool this area and avoid overheating of control components, the controller 16 is operatively connected to exhaust fan motors 66 which control fans that draw air flow out of the cabinet 18 and/or out of the popping chamber at zones like the top portion 36. Heated and/or humid air may thus be discharged through external cabinet vents 68 as shown in FIG. 1. These external cabinet vents 68 may be duplicated and repositioned at other areas of the cabinet 18 as will be understood by one of ordinary skill in the art. The controller 16 also connects with cabinet lights 70 which illuminate the popping machine 10 in a functional and aesthetically pleasing manner. Although not shown in FIGS. 1 and 2, the popping machine 10 may include other components that are not shown and which are customary or typical in known popcorn popper designs depending on the preferences of the end user.

Returning with reference to FIG. 2, the controller 16 is also operatively coupled to several additional elements used in performing the advantageous functionalities described with respect to the operational flowcharts detailed below. To this end, the popping machine 10 includes a storage device in the form of a memory 72 in this embodiment, the memory 72 being configured to store a plurality of stored sets of predetermined cooking temperature set points which are to be used to help control operation of the components with the controller 16 during a popping cycle. The popping machine 10 also includes a power switch 74 for turning the components of the popping machine 10 on or off in their entirety, and this power switch 74 is shown operatively connected to the controller 16 in FIG. 2 as well as along the front wall 26 adjacent to the user interface 14 in FIG. 1. To this end, the controller 16 may also in some embodiments control power supply to each of the other components, depending on the position of the power switch 74.

The popping machine 10 of this embodiment also includes various elements for sending and receiving signals to and from an operator of the popping machine 10. In this regard, the controller 16 is operatively coupled to audible alarms 76 which may be activated according to the alarm routine described in the operational flowcharts detailed below. The audible alarms 76 are activated to produce one or more types of alerts which can be used to alert an operator when actions are required at the popping machine 10. The user interface 14 is also operatively coupled with the controller 16, and the user interface 14 of this embodiment includes a combination of membrane switches 78 configured to receive input from an operator and indicator lights 80 configured to provide visual feedback to operators similar to the audible feedback provided with the audible alarms 76. The indicator lights 80 are LEDs in this embodiment, but it will be understood that other indicators may be used such as a lighted touch screen or LCD panel, or other known display devices. These features of the user interface 14 are described in further detail below as well. Consequently, the controller 16 is connected to each of the components of the popping machine 10 that are needed to perform a popping cycle, and the controller 16 is also connected to elements defining controls and feedback for interacting with operators of the popping machine 10.

With reference to FIG. 3, the user interface 14 of the popping machine 10 in this embodiment is shown in further detail. As described above, the user interface 14 and the audible alarms 76 are components which enable communication between the controller 16 and an operator of the popping machine 10. The user interface 14 includes a plurality of the membrane switches 78, which in this embodiment include an oil dispense switch 78*a* for controlling the oil pump system 46 (e.g., allowing an operator to prompt for oil to be added at the beginning of a popping cycle), an oil "master" switch 78*b* for controlling the oil heater 50 (when these components are included in the popping machine), a kettle heat switch 78*c* configured to control on/off operation of the heating elements 34 when necessary, a stir motor switch 78*d* configured to provide signals for controlling the kettle drive stir motor 54, a crisper switch 78*e* configured to provide signals for controlling the blower motor 60 and heat element 62 associated with the service platform 28, and a mode selector switch 78*f* configured to receive operator input on what operational mode to use at the controller 16. Many of these elements or functions are automatically controlled or activated by the controller 16 during normal operation of the popping machine 10, but these membrane switches 78 provide a master control for overriding operation or controlling operation when that is desired by an operator. Furthermore, although these switches are membrane switches 78 in the embodiment shown in FIG. 3, it will be appreciated that other types of input switches or devices may be used on the user interface 14 in other embodiments consistent with the scope of this invention.

The user interface 14 of this embodiment also includes a plurality of the indicator lights 80, which in this embodiment include an oil dispense light 80*a* for showing when oil dispensing into the kettle 12 occurring, an oil system master light 80*b* for indicating when the oil heater 50 is active, a kettle heat light 80*c* indicating when the heating elements 34 are operating, a stir light 80*d* indicating when the stir motor 54 is operating, a crisper light 80*e* indicating when the blower motor 60 and/or heat element 62 are activated, a plurality of operational mode lights 80*f* showing the type of popped popcorn and/or the popcorn kernel type to be used in the current popping cycle, and a plurality of action prompting lights 80*g* indicating when an operator should take a specific action at the popping machine such as loading of kernels into the kettle 12 or dumping of popped popcorn from the kettle 12. The indicator lights 80 are single or multi-color light emitting diodes in this embodiment, but it will be understood that the particular type of illumination device and the layout of those indicator lights 80 may be modified in other embodiments of this invention. The user interface 14 and audible alarms 76 must simply be adapted to provide clear and timely feedback to the operator of the popping machine 10 as set forth in further detail below.

Having now described many of the physical components of the popping machine 10 of this invention, a further understanding of the invention may be obtained by the following discussion of the operation of the popping machine 10 and its controller 16. A series of related operational flowcharts is illustrated in FIGS. 4A through 6. Before describing those flowcharts and the operation of the popping machine 10 according to this embodiment, a general overview of the popping machine functionality will help provide context to the following detailed description.

Figure 6:
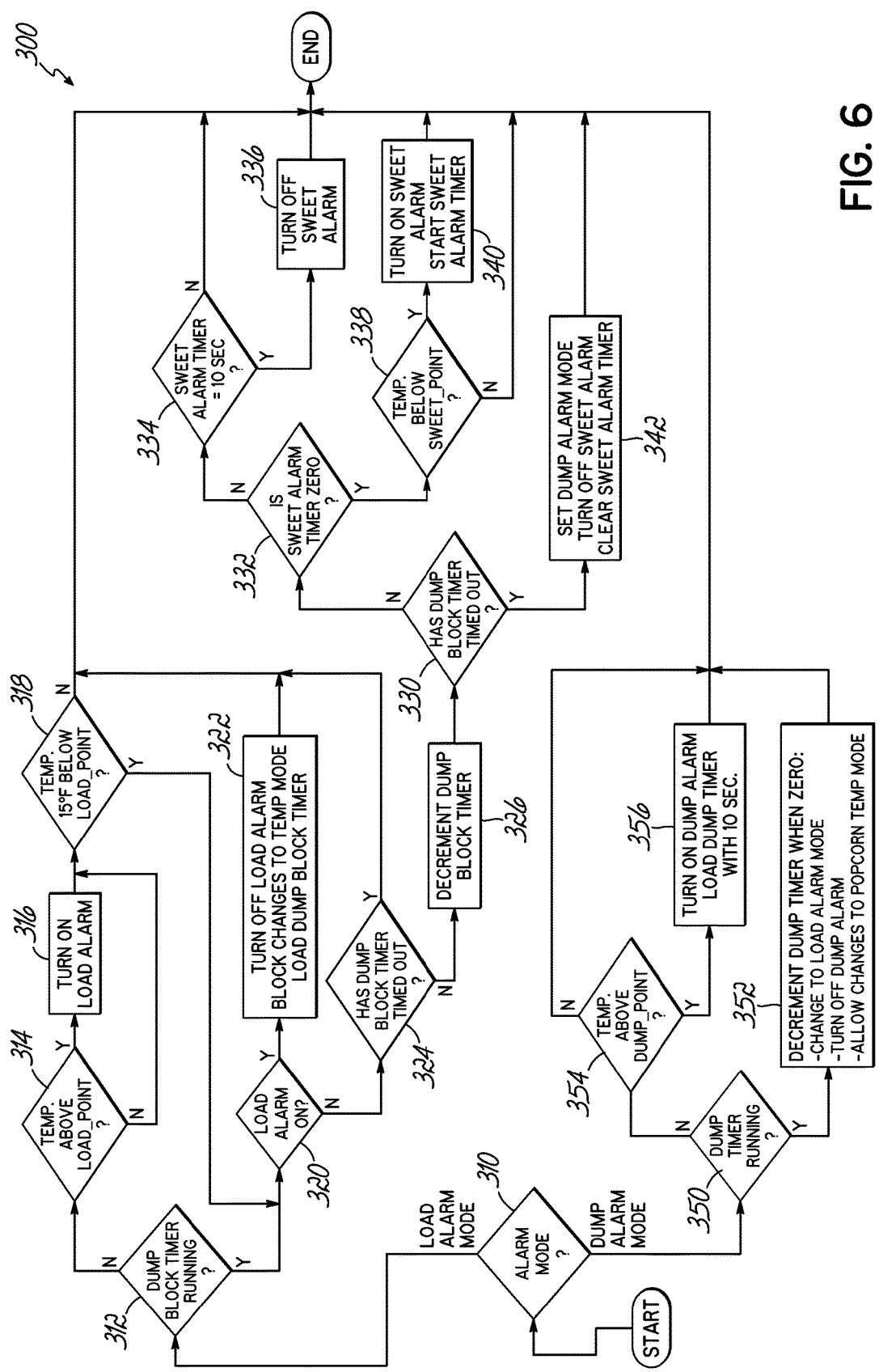
FIG. 6 is an operation flowchart defining an alarm routine included in the main control loop of FIGS. 4A and 4B, and which is operated by the systems and components of the popping machine of FIG. 1 to control when alarms are provided to operators by the popping machine.
Figure 7:
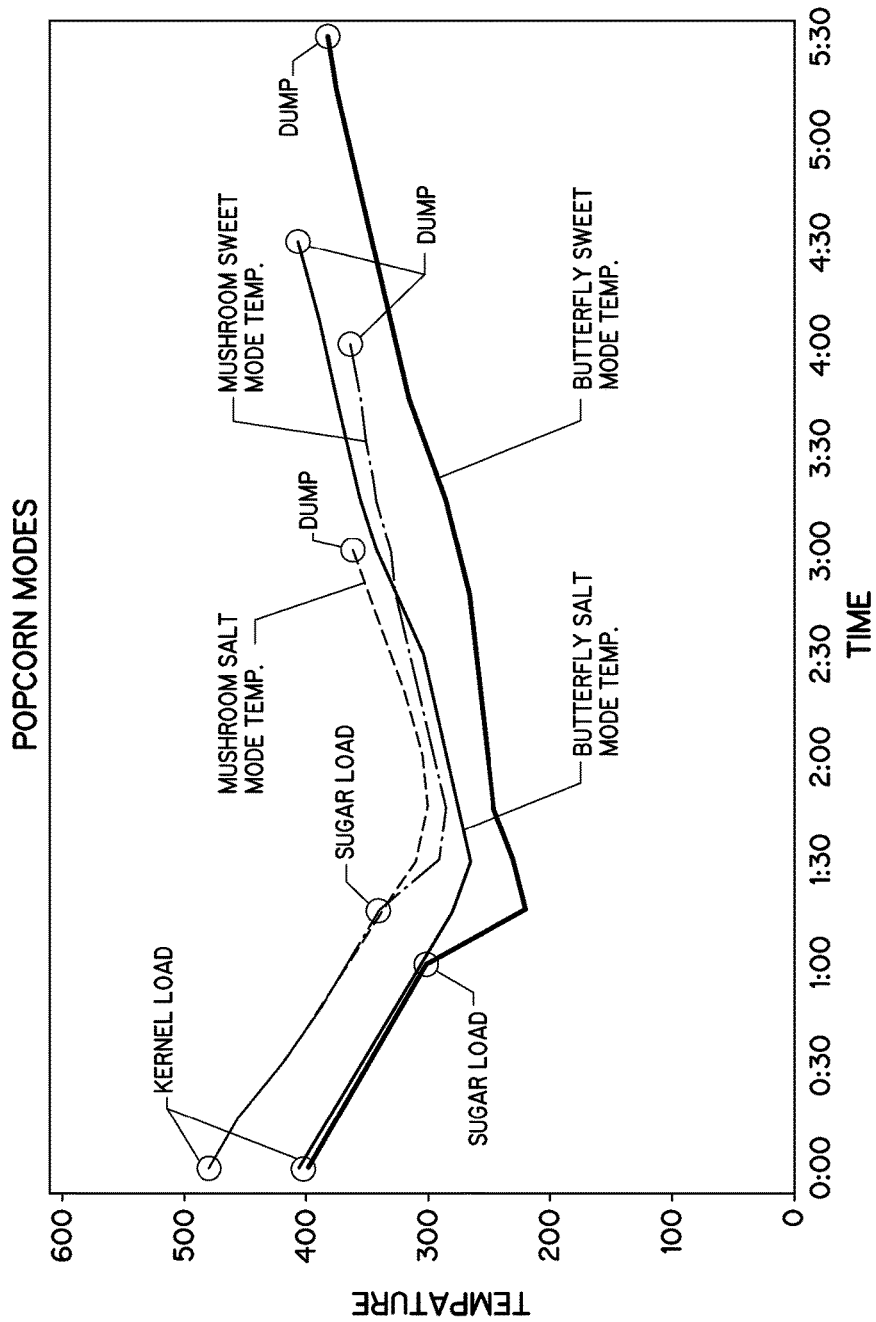
FIG. 7 is a graphical illustration of various popping cycles to produce different types of popped popcorn using different types of popcorn kernels in accordance with one specific embodiment of a popping machine and kettle configuration, specifically plotting kettle temperature over time to show differences between the popping cycles and also points where operator action may be prompted by the popping machine of FIG. 1.

To this end, FIG. 7 is a graphical plot showing sample cooking temperature curves over time for popping cycles of different popcorn kernel types and different types of popped popcorn as well, at least in the example using the kettle 12 of FIG. 1 which is configured to receive 16 ounce batches of popcorn kernels. These temperature curves (defined by temperature at the kettle 12) are configured to produce optimally popped popcorn. Although the specific details are described for these sample temperature curves below, a cursory review of FIG. 7 reveals the important aspect that the load temperatures and the dump times and temperatures vary depending on the specific operational mode of the popping machine 10, which is defined by the type of popcorn kernel (including butterfly or mushroom) and the type of popped popcorn (including salt or sweet). Therefore, for each different popping cycle creating a different type of popcorn, the controller 16 must operate using different temperature and/or time thresholds in order to optimally cook and pop the desired type of popcorn. The operational flowcharts of FIGS. 4A through 6 describe one embodiment for how the controller 16 and popping machine 10 manage such variations in optimal temperature curves over time for popping cycles.

Also generally speaking with regard to the embodiment described below, the popping machine 10 is operable to monitor the temperature of the kettle 12 to automatically alert the operator to load ingredients to automatically begin a popping cycle when the ingredients are loaded, and to end the popping cycle and automatically initiate a dump to empty the popped popcorn and again alert the operator to load more ingredients for the next batch. The popping machine 10 monitors the kettle temperature and/or the time elapsed and determines at certain set points, defined by the kettle temperature and/or the elapsed time, which operations are to be automatically executed or prompted for action by the operator. For simplicity in the description of the exemplary embodiment below, these set points are defined by temperature values at the kettle, and are also referred to as "temperature set points" herein. For example, the controller 16 of the popping machine 10 in one embodiment operates the components of the popping machine 10 by determining what type of popcorn kernels are to be cooked in a popping cycle, retrieving a set of predetermined cooking temperature set points associated with cooking that selected type of popcorn, heating the kettle 12 to an optimal temperature for loading oil and kernels, alerting the operator to load the kernels at this temperature, optionally alerting the operator to add sugar to the kettle 12 at a certain temperature where the sugar or sweetened coating will not burn in the kettle 12, heating the kettle 12 back up to a dump point temperature, and prompting for the popped popcorn to be dumped from the kettle 12 at this dump point temperature. Therefore, an operator is assisted with properly cooking and popping popcorn kernels of different types, even when a sweetened coating is to be applied to the popcorn, while being free to handle other items during most of the popping cycle.

Figure 4A:
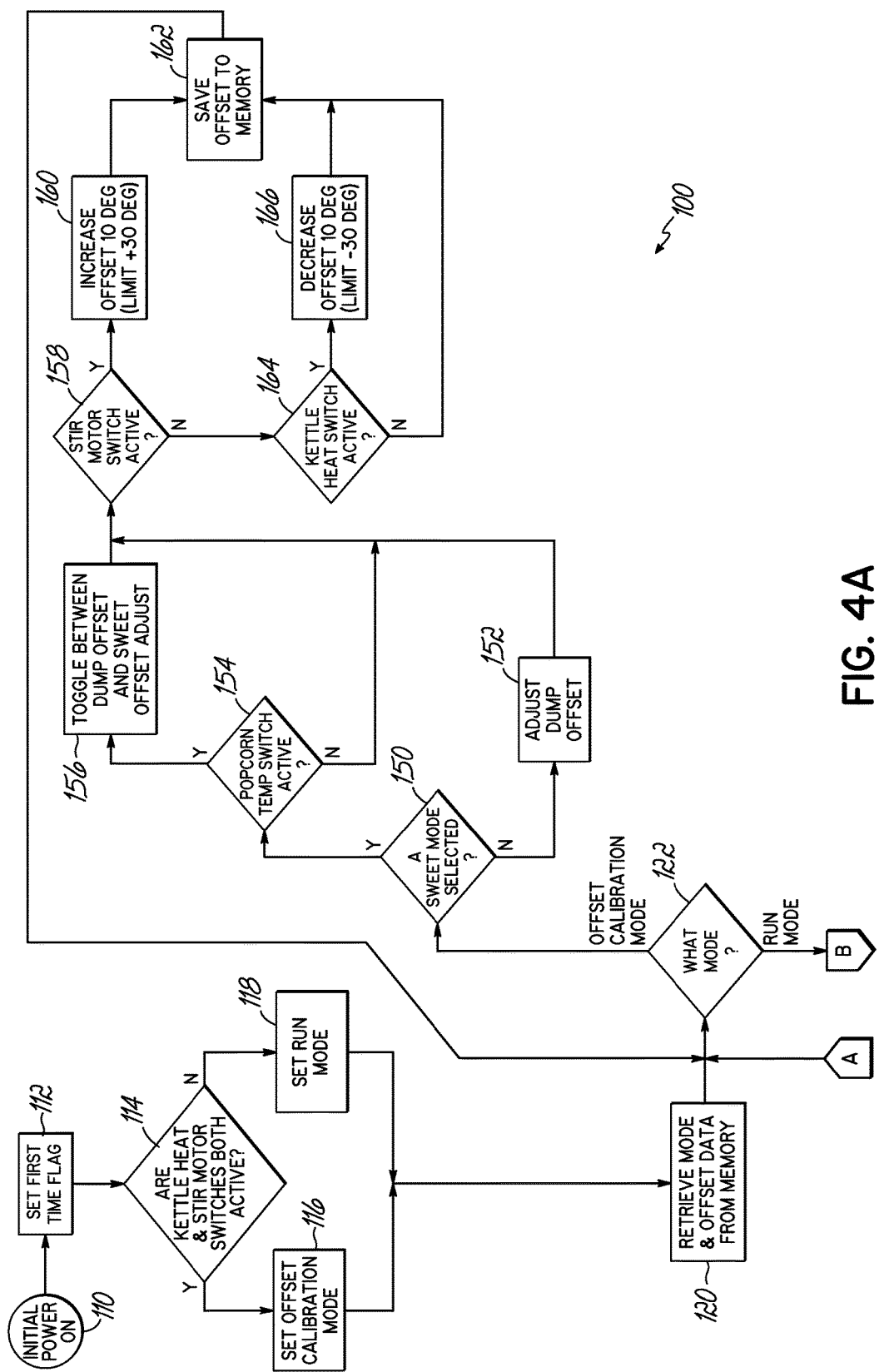
FIGS. 4A and 4B are an operation flowchart defining a main control loop operated by the systems and components of the popping machine of FIG. 1, according to one embodiment for the operation thereof.
Figure 4B:
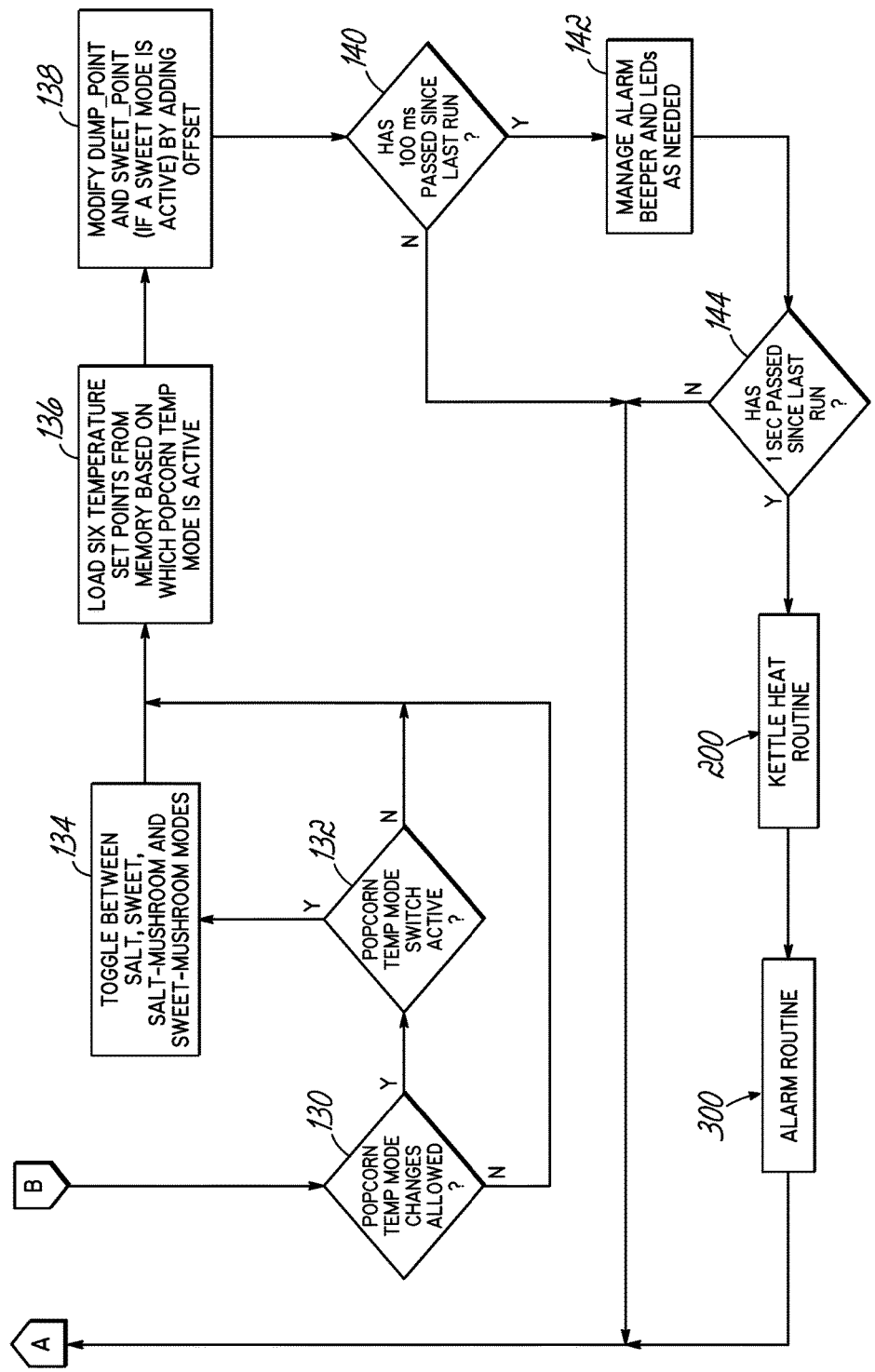

Now turning with reference to FIGS. 4A and 4B, the primary or main control loop 100 performed by the controller 16 and popping machine 10 of this embodiment of the invention is shown in further detail. An initial power up of the popping machine 10 is shown at block 110, and this action is caused when the operator activates the power switch 74 one the cabinet 18. Before entering a repeating loop portion of the main control loop 100, a series of steps is performed by the controller 16 to determine what operational mode is active. These operational modes include at least an offset calibration mode for adjusting operator-determined offsets to temperature set points, and a run mode for performing popping cycles at the popping machine 10. After the initial power up at block 110, the controller 16 sets a first time flag at block 112 for use in determining how to heat the kettle 12 later in the process. The controller 16 then determines at block 114 whether the operator was pressing both of the kettle heat switch 78c and the stir switch 78d on the user interface 14 when the power was initially turned on. If so, the controller 16 activates the offset calibration mode at block 116, and if not, the controller 16 activates the run mode at block 118. Thus, unless the operator presses the specific combination of switches or buttons necessary to enter the offset calibration mode, the controller 16 will default to the run mode, which is the normal operation of the popping machine 10. It will be understood that in other embodiments of this process, a different combination of switches may be used to activate the offset calibration mode without departing from the scope of the invention.

After setting or activating the operational mode based on the operator input at the initial power up, the controller 16 retrieves from the memory 72 what the most recent popcorn temperature mode was used at block 120, such as the one in the final popping cycle performed before power down. The popcorn temperature mode is defined by the type of popcorn kernel to be cooked as well as whether the popped popcorn is to be salt or sweet, for example. The controller 16 also retrieves from the memory 72 or other storage device any offsets previously set by the operator of the popping machine at block 120. These offsets may include at least a dump offset and a sweet offset, as described in further detail below. The controller 16 then begins the loop portion of the main control loop at block 122, with the next step determined by whether the controller 16 is operating in the offset calibration mode or in the run mode.

When the run mode is active, the controller 16 continues with the steps shown in the flowchart on FIG. 4B. To this end, the controller 16 cycles through the series of steps between entry flag "B" and exit flag "A" on FIG. 4B about every 8.333 milliseconds, with the loop time being interrupt driven by a power line frequency and/or an internal oscillator. For each pass through this loop, the controller 16 begins by determining whether the popcorn temperature mode is being changed by the operator at the user interface 14. More particularly, the controller 16 determines whether popcorn temperature mode changes are currently allowed at block 130 (there are times when such mode changes are blocked like during alarm activations as set forth below), and then if changes are currently allowed, the controller 16 determines whether the operator is pressing the mode selector switch 78f on the user interface 14 at block 132. If the mode selector switch 78l is active, the controller 16 cycles through the different popcorn temperature modes by illuminating the appropriate indicator lights 80f on the user interface 14 until the desired mode is selected by the operator releasing the mode selector switch 78f, at block 134. Following this setting of the popcorn temperature mode at block 134, or if no changes were allowed or desired according to the controller actions at blocks 130 and 132, the controller 16 continues with the next steps of the main control loop 100.

The controller 16 then retrieves from memory 72 at block 136 the set of predetermined temperature set points which are associated with the current popcorn temperature mode that was selected or retained in the previous steps. In this embodiment, the set of predetermined temperature set points includes at least six set points defined by specifically-identified temperature values; a cold point temperature defining a threshold for determining whether the kettle 12 was cold at an initial power up of the popping machine 10, a coast point temperature defining a threshold for turning off heat energy to the kettle 12 as the kettle 12 approaches the load point temperature after starting from a cold kettle, a set point temperature defining a temperature that is to be maintained at the kettle 12 such as between popping cycles, a load point temperature at which a batch of kernels and cooking oil should be added to the kettle 12 at the beginning of a popping cycle, a dump point temperature at which the popped popcorn should be dumped from the kettle 12 at the end of a popping cycle, and a sweet point temperature defining when to add sugar to the kettle 12 when a sweet mode is active. As described further below, in other embodiments of this invention, the predetermined temperature set points are instead defined by specifically-identified time values which correspond to when the temperatures will be reached during a normal popping cycle for actions such as loading and dumping relative to the kettle 12, but the methodology described below functions regardless of what type of value is used for the set points. Each of these set points is referenced again in the further control steps below, particularly in the kettle heat routine 200 and the alarm routine 300. Following retrieval and loading of the set of predetermined temperature set points, the controller 16 modifies the dump point temperature and the sweet point temperature by adding the dump offset and sweet offset, respectively, if those have been set by an operator, at block 138. Thus, the controller 16 in each loop loads the pertinent temperature set points for performing the desired optimal cooking for the current selection of popcorn kernel types.

The controller 16 continues the run mode by determining whether 100 milliseconds have passed since a previous management of audible alarms and indicator lights at block 140. This action is chosen in the current embodiment to occur once every 12 passes through the run mode loop. In this regard, once every 12 loops, the controller 16 will continue to block 142, at which point the controller 16 will activate and/or deactivate any audible alarms 76 and indicator lights 80 as needed for the current operation of the popping machine 10. Further information on this step at block 142 will be evident from a review of the alarm routine 300 described in further detail with reference to FIG. 6 below. If the controller 16 determines that 100 milliseconds have not passed since the previous management of alarms and lights at block 140, the controller returns to the beginning of the run mode loop at block 122 as shown in FIG. 4B.

The controller 16 is also configured to perform a kettle heat routine 200 and an alarm routine 300 once per second, which is approximately once every 120 passes through the run mode loop. To this end, the controller determines at block 144 whether 1 second has passed since the most recent performance of the kettle heat routine 200 and the alarm routine 300. If so, the controller 16 then performs those routines as described in further detail with reference to FIGS. 5 and 6 below, the kettle heat routine 200 being used to determine whether to turn on or off heat energy to the kettle 12 and the alarm routine 300 being used to evaluate whether operator alarms need activated or deactivated based on an evaluation of the temperature at the kettle 12. If 1 second has not passed since these routines were completed, the controller 16 returns to the beginning of the run mode loop at block 122 as shown in FIG. 4B, The controller 16 also returns to the beginning of the run loop mode after completion of the kettle heat routine 200 and the alarm routine 300, thereby ending the process for one cycle through the run mode loop.

Returning to FIG. 4A, when the offset calibration mode is active, the controller 16 continues with the steps shown in that Figure. In this mode, the aforementioned dump offset and sweet offset can be changed by the operator (original factory settings will have these offsets at 0° F. for both in each popcorn temperature mode, but this can be changed to fit operator preferences). In this regard, the controller 16 begins at block 150 by determining whether a sweet mode is active, which means that the type of popped popcorn to be produced using the currently-selected popcorn temperature mode is one with a sweetened coating. If the popcorn temperature mode is not a sweet mode for producing sweet popcorn, the controller will adjust the dump offset only at block 152. The operator in this embodiment can changes the offset in 10 degree increments using the stir switch 78d and the kettle heat switch 78c on the user interface 14, but it will be understood that different buttons can be used in other embodiments of the popping machine 10.

More specifically, the controller 16 continues to block 158 where it is determined whether the stir switch 78d is active (e.g., pressed by the operator). If the operator is pressing the stir switch 78d, the controller 16 increases the dump offset by 10° F. at block 160 unless the dump offset is already at an upper limit value, typically set to 30° F. in this embodiment. The new dump offset is saved to the memory 72 for the current popcorn temperature mode at block 162. If, on the contrary, the controller 16 does not detect that the stir switch 78d is active at block 158, the controller 16 moves to block 164 where it is determined whether the kettle heat switch 78c is active such as by being pressed by the operator. If the operator is pressing the kettle heat switch 78c, the controller 16 decreases the dump offset by 10° F. at block 160 unless the dump offset is already at an lower limit value, typically set to −30° F. in this embodiment. The new dump offset is saved to the memory 72 for the current popcorn temperature mode at block 162. After the new dump offset is saved to the memory 72 at block 162, including when no changes are to be made based on no operator switch input detected at blocks 158 and 164, the controller 16 returns to the beginning of the offset calibration mode at block 122.

Returning to block 150, if the controller 16 determines that a sweet mode is currently active, then both the dump offset and the sweet offset can be adjusted. To enable this, the controller 16 first checks for whether the operator is pressing the mode selector switch 78f at the user interface 14 at block 154. If the mode selector switch 78f is active, then the controller 16 will toggle between the dump offset and the sweet offset (indicating as such to the operator using one or more of the indicator lights 80) until the mode selector switch 78f is not pressed any longer. On the contrary, if the mode selector switch 78f was not active at block 154, whichever of the dump offset and sweet offset which was previously being modified will continue to be what is adjusted in the current loop. The loop then continues with the steps described above at blocks 158 through 166 to evaluate whether the operator is pressing one of the switches to increase or decrease the offset being adjusted, and then saving the new offset to memory 72 before returning to the beginning of the offset calibration mode loop at block 122. These blocks 158 through 166 operate in the same manner as above regardless of whether the sweet offset or the dump offset is being adjusted, so a duplicative description is not provided here for the sake of brevity.

It will be understood that during the loops through the offset calibration mode shown in FIG. 4A, the various indicator lights 80 may be used to display what changes are being made to what offsets by the operator, so that it can be verified that the desired changes are made. When the operator desires to leave the offset calibration mode, which repeats continuously if the appropriate switches were activated at block 114 following initial power up of the popping machine 10, the power switch 74 must be turned off and back on to allow the popping machine 10 and controller 16 to go into the run mode (which will then use any updated offsets as stored in the memory 72 during the operation of the offset calibration mode. Thus, an operator has some limited control over how the predetermined temperature set points are configured in the different popcorn temperature modes and popping cycles, in accordance with this embodiment of the invention.

Figure 5:
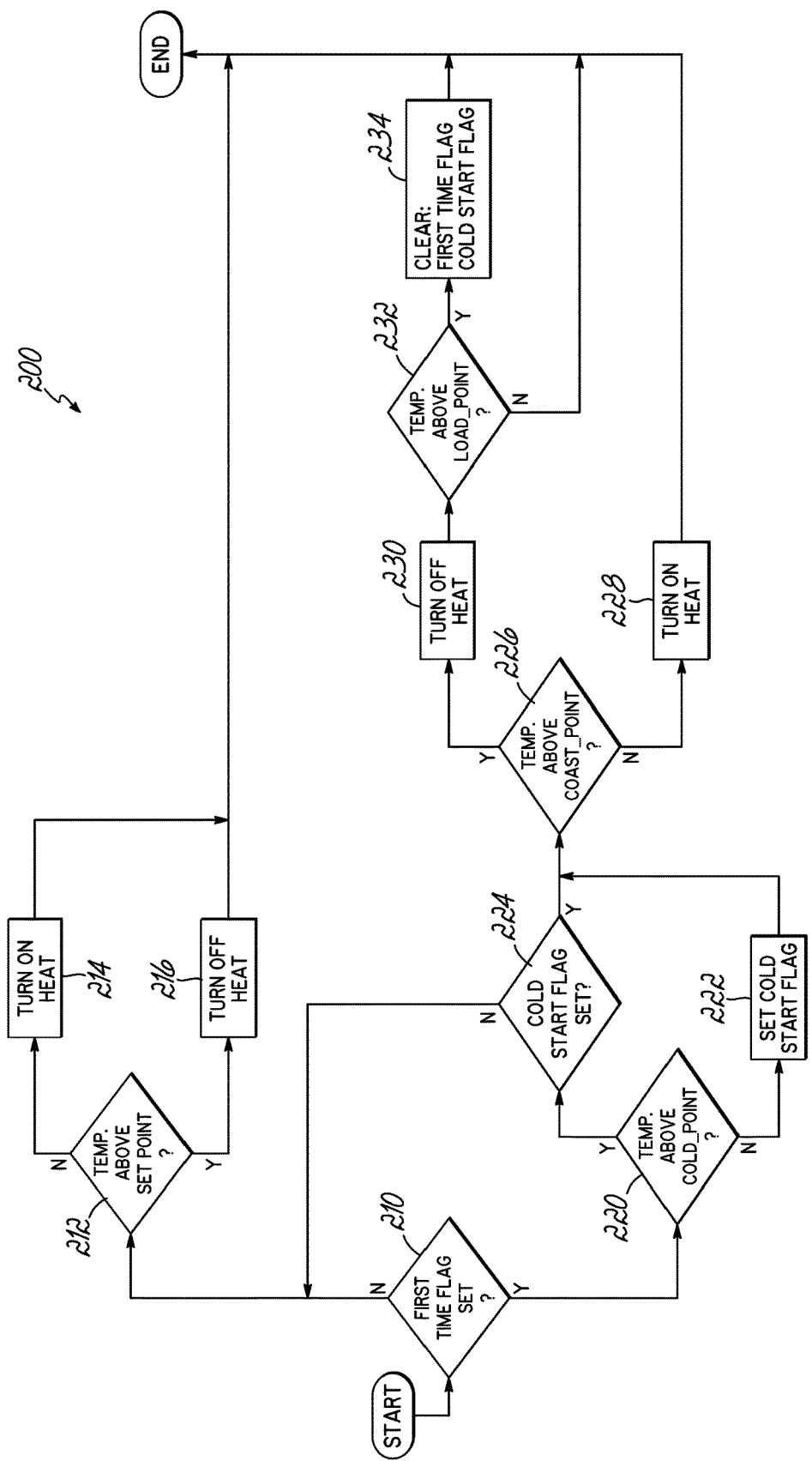
FIG. 5 is an operation flowchart defining a kettle heat routine included in the main control loop of FIGS. 4A and 4B, and which is operated by the systems and components of the popping machine of FIG. 1 to control when heat energy is applied to a kettle of the popping machine.

As described above, when the controller 16 is operating in the run mode, the kettle heat routine 200 is performed once every second to determine whether to turn on or off heat energy applied to the kettle 12. This routine 200 is wholly independent and separate from the alarm routine 300 described in further detail below. With reference to FIG. 5, the kettle heat routine 200 includes a series of operational steps between a start point and end point shown in that Figure. To this end, the controller 16 begins the kettle heat routine 200 by determining if the first time flag was set at block 210. As a reminder, the first time flag is set at block 112 during the initial power up of the popping machine 10. If the first time flag is not set at block 210, the standard control performed during most of the operation of the popping machine 10 is used as follows. The controller 16 continues in such case to block 212, where the controller 16 determines whether the temperature of the kettle 12, as measured by the heat sensor 37, is above the set point temperature loaded from memory 72 for the current popcorn temperature mode. If the temperature of the kettle 12 is not above the set point temperature, the controller 16 sends a signal at block 214 to turn on the heating elements 34 associated with the kettle 12. If the temperature of the kettle 12 is above the set point temperature, the controller 16 instead sends a signal at block 216 to turn off the heating elements 34 associated with the kettle 12. Following the sending of a signal at blocks 214 or 216, the current pass through the kettle heat routine 200 ends. It will be understood that a small hysteresis value such as 4° F. may be built into the determination at block 212 to avoid having the heating elements switched on and off too rapidly.

If, on the other hand, the first time flag was determined to be set at block 210, the controller 16 moves through a different set of steps of the kettle heat routine 200 which are configured to properly handle cold starts of the kettle 12. To this end, the controller 16 evaluates at block 220 whether the temperature at the kettle 12 is above the cold point temperature loaded from memory 72 for the current popcorn temperature mode. If the temperature of the kettle 12 is not above the cold point temperature, indicating an initial start of the popping machine 10 from a cold state, the controller 16 sets a cold start flag to active at block 222 before continuing on to block 226 described below. If, on the other hand, the temperature of the kettle 12 is above the cold point temperature at block 220, the controller 16 proceeds with a determination of whether the cold start flag was set to be active at block 224. If the cold start flag was set, then controller 16 proceeds with block 226 just like when the cold start flag is initially set as described above. However, if the cold start flag is not set at block 224, which would indicate an initial power up from a hot state of the kettle 12, then controller 16 moves to the so-called standard control at steps 212 through 216 using the set point temperature for controlling the heating elements 34 at the kettle 12.

Now returning to block 226, which occurs whenever the first time flag and the cold start flag are set to be active during the current run through the kettle heat routine 200, the controller 16 operates a series of steps defining a first time power-up control of the heating of the kettle (rather than the standard control). The controller 16 begins this first time power-up control by determining at block 226 using measurements from the heat sensor 37 whether the kettle 12 is above the coast point temperature loaded from memory 72 for the current popcorn temperature mode. If the temperature of the kettle 12 is not above the coast point temperature, which means the kettle 12 is still heating up from the cold start, the controller 16 sends a signal at block 228 to turn on the heating elements 34 associated with the kettle 12, and the current pass through the kettle heat routine 200 then ends. If the temperature of the kettle 12 is above the coast point temperature at block 226, the controller 16 sends a signal at block 230 to turn off the heating elements 34 associated with the kettle 12. This allows the kettle 12 to coast upward towards the load point temperature rather than overshooting that temperature by a significant amount during the initial warming from a cold state. The controller 16 then determines at block 232 whether the temperature of the kettle 12 is above the load point temperature loaded from memory 72 for the current popcorn temperature mode. If the temperature of the kettle 12 is not above the load point temperature yet, which indicates the kettle 12 is still coasting upward in temperature towards this set point, the current pass through the kettle heat routine 200 then ends. However, if the temperature of the kettle 12 is above the load point temperature at block 232, which means the kettle 12 has been heated to the sufficient level to begin the popping cycle, the controller 16 proceeds to clear the first time flag and the cold start flag at block 234 before the current pass through the kettle heat routine 200 ends. As a result of clearing the flags, the next time through the kettle heat routine 200 will operate using the so-called standard control based on the set point temperature rather than continuing with the first-time power up control series of steps because the kettle 12 will not be needing heated from a cold start at that point.

To summarize, the kettle heat routine 200 accurately assesses once per second during the run mode loop whether heating is needed at the kettle 12, and the heating elements 34 are turned on or off according to the steps described above, thereby accurately managing operation of the heating elements 34 for all popping cycles.

As described above, when the controller 16 is operating in the run mode, the alarm routine 300 is also performed once every second to determine whether to turn on or off any alarms for the operator. This routine 300 is wholly independent and separate from the kettle heat routine 200 described in further detail above. With reference to FIG. 6, the alarm routine 300 includes a series of operational steps between a start point and end point shown in that Figure. To this end, the controller 16 begins the alarm routine 300 by determining at block 310 whether the popping machine 10 is in a load alarm mode or a dump alarm mode. The load alarm mode is the default at the initial power up, but the alarm routine 300 includes having the controller 16 switch between these two alternative modes when appropriate, as detailed below. The load alarm mode is active when the controller 16 is getting ready to prompt an operator or an automated system for loading of kernels and cooking oil into the kettle 12, while the dump alarm mode is active when the controller 16 is waiting to prompt an operator or automated system to dump popped popcorn from the kettle 12. Consequently, the description below of the alarm routine begins with the steps associated with the load alarm mode.

When the load alarm mode is active at block 310, the controller 16 first determines whether a dump block timer is running at block 312. This dump block timer is not running initially and will be explained in further detail below. As such, when the dump block timer is not running, the controller 16 then determines at block 314 whether the temperature at the kettle 12, as measured by the heat sensor 37, exceeds the load point temperature that is loaded from memory 72 for the current popcorn temperature mode. If the temperature at the kettle 12 is above the load point temperature, indicating that the kettle 12 is ready to receive a batch of popcorn kernels and cooking oil, the controller 16 turns on a load alarm at block 316. The load alarm at block 316 includes one or both of the audible alarms 76 and the indicator lights 80 to signal the operator to take the appropriate action, e.g., load kernels into the kettle 12 (and oil, when the oil pump system 46 is not provided or when an operator prompt is required at the user interface 14 to activate the oil pump system 46). It will be understood that the controller 16 may alternatively send a signal to the oil pump system 46 at this time to load cooking oil into the kettle 12, in non-illustrated embodiments with a fully automated oil pump system 46. After activating the load alarm (or when the temperature of the kettle 12 has not yet exceeded the load point temperature at block 314), the controller 16 moves to the end of the current pass through the alarm routine 300. To this end, the controller 16 technically checks at block 318 whether the temperature of the kettle 12 has fallen 15° F. below the load point temperature, but this will not occur until after the operator loads the kernels into the kettle 12, as will be readily understood by those skilled in the art of popcorn poppers.

The controller 16 effectively waits while the load alarm is on for the operator to load the kernels, such that the temperature at the kettle 12 drops to the extent required at block 318, by repeating these sequence of steps along the top of the operational flowchart in FIG. 6. Once the controller 16 determines that the temperature of the kettle 12 has fallen 15° F. below the load point temperature at block 318 (effectively checking once per second based on how often the alarm routine 300 is operated as set forth above), the alarm routine 300 continues by having the controller 16 determine if the load alarm is turned on at block 320. If the load alarm is on, the controller 16 at block 322 turns off the load alarm because the operator has complied with the prompt to start the popping cycle with loading a batch of popcorn kernels into the kettle 12. Also at block 322, the controller 16 blocks any changes to the popcorn temperature mode at the user interface 14 and loads/starts the dump block timer initially referenced above before ending the current pass through the alarm routine 300.

The dump block timer is a predetermined-duration timer which keeps the controller 16 in the load alarm mode to allow for cooking of the popcorn kernels for a sufficient minimum period of time before starting to check for whether to sound the dump alarm in the dump alarm mode and steps outlined below. In many embodiments where the dump point temperature is lower than the load point temperature, this prevents the popping machine 10 from sending a premature signal to dump the popcorn immediately after turning the load alarm off (which would be the case if this dump block timer were not used). In the current embodiment, the dump block timer is a 90 second timer, but this value may be modified in other embodiments (and also could be potentially set to different values for different popcorn temperature modes as well). Moreover, the dump block timer starts at 90 seconds in this embodiment and is decremented until it runs out or times out at zero. It is necessary to block the operator from making changes to the popcorn temperature mode once the kettle 12 has been loaded with kernels to ensure that the popcorn kernels are popped with consistent temperature settings throughout the entirety of the popping cycle from initial loading to terminal dumping. This prohibition on popcorn temperature mode changes remains in effect until removed by a later cycle of the alarm routine 300.

While the dump block timer is running, the controller 16 remains in the load alarm portion of the alarm routine 300 during the repetition of this routine every 1 second. During this time, the controller 16 at block 312 moves through the lower branch to block 320 shown in FIG. 6 as a result of the dump block timer now running. Because the load alarm will also be turned off at this time, the controller 16 will move from block 320 to then determine whether the dump block timer has timed out at block 324. If the dump block timer has timed out (which should not occur during the normal sequence of operations described herein after the popping cycle has begun because the dump alarm mode is set immediately upon this happening as set forth in the following steps of the load alarm mode), the current run through the alarm routine 300 ends. For reference, the only time in which the controller 16 would normally determine that the dump block timer has timed out at block 324 would be before the kettle 12 reaches the load point temperature during initial heating up of the kettle 12, as the load alarm mode is the default upon initial power up of the popping machine 10, and the controller 16 would move through the NO branch of block 312, the NO branch of block 314, the YES branch of block 318, and the NO branch of block 320 during this initial heat up. In this regard, the inquiry at block 324 has the principal purpose of keeping the controller 16 in the default load alarm mode before a popping cycle begins.

Returning back to the normal course of events during the popping cycle, when the controller 16 determines at block 324 that the dump block timer has not yet timed out, the controller 16 then decrements the dump block timer by 1 second (because the alarm routine 300 operates once per second) at block 326. The controller 16 then determines at block 330 whether the dump block timer has timed out as a result of the decrement done at block 326. If the dump block timer has not run out, meaning that the kettle 12 is still in the middle of cooking the popcorn, the controller 16 proceeds through a series of steps to check if a sweet alarm should be managed relative to notifying the operator when sugar or a sweetened coating should be added to the kettle 12 during the popping cycle (for sweet popcorn modes). Those steps are described as follows.

First, the controller 16 determines whether the sweet alarm timer is zero, which is the initial value of this timer, at block 332. If the sweet alarm timer is zero, then the controller 16 determines whether the temperature of the kettle 12 has fallen below a sweet point temperature which is loaded from memory 72 and associated with the current popcorn temperature mode. For popcorn temperature modes configured to produce sweet popcorn, this sweet point temperature is set to a value at which the operator should add sugar to enable the sweetened coating to be applied without burning the sugar during the popping cycle. For popcorn temperature modes configured to produce salt popcorn or other non-sweet types, this sweet point temperature is generally set to a value well below what the kettle 12 will ever reach in the popping cycle so that the prompt described below is never actuated (e.g., there is no prompt to add sugar when that is not desired). If the temperature of the kettle 12 is not below the sweet point temperature at block 338, the current run through the alarm routine 300 ends because the kettle 12 is not ready for the addition of the sugar yet. If the temperature of the kettle 12 is below the sweet point temperature at block 338, the controller 16 at block 340 turns on a sweet alarm and starts the sweet alarm timer before ending the current run through the alarm routine 300.

As noted above, the sweet alarm timer runs upwardly from an initial value of zero, and in this embodiment, the sweet alarm is configured to last for 10 seconds (e.g., some predetermined time lapse desired). To this end, the sweet alarm includes some combination of illuminating indicator lights 80 on the user interface 14 and/or audible alarms 76 to alert the operator that it is time to add sugar to the kettle 12. For example, the sweet alarm in one embodiment includes 10 seconds of illuminated LEDs at the user interface 14 and five beeps of a beeper defining the audible alarms 76.

Returning to block 332, when the controller 16 returns to this block and determines that the sweet alarm timer is not zero (as a result of at least one second passing since the pass through the alarm routine 300 that started the sweet alarm timer at block 340), the controller 16 then determines at block 334 whether the sweet alarm timer has reached 10 seconds. If the sweet alarm timer is not at 10 seconds, no action is required and the current pass through the alarm routine 300 ends. However, if the sweet alarm timer is at 10 seconds, the controller 16 turns off the sweet alarm at block 336 before the current pass through the alarm routine 300 ends. It will be understood that while the sweet alarm is set to run for 10 seconds in this embodiment, the threshold of time for which to turn off the sweet alarm could be adjusted in other embodiments depending on operator preferences.

As long as the dump block timer continues to run after the sweet alarm occurs, no further action will take place in the alarm routine 300 because the controller 16 will move through the NO branch of block 320, followed by the NO branch of blocks 332 and 334 (the sweet alarm timer will be more than 10 seconds at this juncture). Returning to block 330, when the decrementing of the dump block timer each second results in the dump block timer timing out or reaching zero, the controller 16 then switches to the dump alarm mode at block 342. In addition, the sweet alarm is turned off at block 342 if it is still active (which may occur, for example, if it takes 80+ seconds before the kettle falls below the sweet point temperature), and the sweet alarm timer is cleared by setting it back to zero. This pass through the alarm routine 300 then ends and the next time the alarm routine 300 occurs the controller 16 will move through the dump alarm mode steps instead of the load alarm steps described above.

When the alarm routine 300 is operated in the dump alarm mode, the controller 16 begins by determining if a dump timer (not to be confused with the dump block timer described above) is running at block 350. If the dump timer is not running, which will be the default when entering the dump alarm mode from the load alarm mode, the controller 16 then checks at block 354 whether the temperature of the kettle 12, as measured by the heat sensor 37, is above the dump point temperature that is loaded from memory 72 and associated with the current popcorn temperature mode. If the temperature of the kettle 12 has not yet exceeded the dump point temperature, which indicates that the popping cycle is not yet completed, the current run through the alarm routine 300 is finished without further action. By contrast, if the temperature of the kettle 12 is above the dump point temperature, the controller 16 turns on a dump alarm at block 356 which includes at least one of illuminating the indicator lights 80 at the user interface 14 and/or sounding the audible alarms 76 to prompt the operator to tilt the kettle 12 and dump the finished popped popcorn onto the service platform 28. Also at block 356, the controller loads the dump timer with 10 seconds (although like the sweet timer and the dump block timer, this is just an exemplary value that is not limiting on all potential embodiments of the operation of popping machine 10). After block 356, the current run through the alarm routine 300 stops.

Just like the sweet alarm, the dump alarm is configured to run for a total of 10 seconds. The result could be a similar 10 second illumination of indicator lights 80 and five beeps from a buzzer acting as the audible alarms 76. Therefore, in the following passes through the dump alarm mode of the alarm routine 300, the controller 16 goes through the YES branch at block 350 because the dump timer is running. The controller 16 at block 352 then decrements the dump timer by one second because the alarm routine 300 is run once per second as set forth multiple times above. Also at block 352, when the decrementing of the dump timer results in the dump timer reaching zero, e.g., 10 seconds after the dump alarm is activated, then the controller 16 also changes back to the load alarm mode, turns off the dump alarm, and removes the block to changes of the popcorn temperature mode at the user interface 14. It is assumed that the dump action has been performed or is being performed by the operator, so the next step would be loading a new batch and that's why the load alarm mode is activated again at this juncture. Furthermore, now that the popping cycle is completed and the popping machine 10 is between cycles, it is acceptable for the popcorn temperature mode to be changed again, if the operator needs to make a new type of popcorn in the next popping cycle. The current pass through the alarm routine 300 is also ended after the actions of block 352 are finished. As such, when the dump timer runs out, the next pass through the alarm routine 300 will again go through the steps of the load alarm mode as set forth in detail above.

To summarize, the alarm routine 300 accurately assesses once per second during the run mode loop whether any alarms (load, sweet, dump) need to be activated or deactivated, thereby accurately managing the audible alarms 76 and indicator lights 80 to produce necessary operator prompts for action during all popping cycles.

Consequently, by operating the controller 16 to follow the operational flowcharts set forth in the embodiment shown in FIGS. 4A through 6, the popping machine 10 is advantageously capable of providing appropriate time prompts for operator action regardless of the popcorn kernel type and popped popcorn type to be produced.

As set forth above, the set of predetermined cooking temperature set points which are stored for each combination of popcorn kernel type and kettle configuration are defined by actual temperature values in the example provided above. These temperature values and thresholds are based on environmental and kettle configuration conditions such as where the temperature sensor is located relative to the kernels and/or the heating elements. In other embodiments, one or more of these predetermined cooking temperature set points can be defined by the associated elapsed time values measured from a beginning of a popping cycle, which are inherently associated with certain desired temperatures for taking the actions required as described with respect to FIG. 7 below. A time sensor or clock element would communicate with the controller 16 in such embodiments. Regardless of what type of value and sensor(s) are used by the controller 16 in performing the methods of this disclosure, an operator is provided with the appropriate prompts for taking action to produce desirable or optimal popped popcorn of any desired type (both currently existing and/or newly-developed strains) which may be programmed into the controller 16 with a series of set points.

Returning to FIG. 7, which shows one set of exemplary or sample temperature curves over time for popping cycles of different popcorn kernel types and different types of popped popcorn as well, four sample temperature curves are shown which can define four different popcorn temperature modes and corresponding sets of predetermined temperature set points in the memory 72 of the popping machine 10 for use with a kettle 12 configured to receive a 16 ounce load of popcorn kernels to be popped. These examples are based on testing for what typically produces optimally popped popcorn of the following types in that specific kettle 12 and setting: butterfly type salt popcorn, butterfly type sweet popcorn, mushroom type salt popcorn, and mushroom type sweet popcorn. Additional temperature curves could be generated for other types of popcorn and/or other configurations and sizes of kettles and used in this invention by simply storing an appropriate set of predetermined temperature set points for that popcorn type and/or kettle configuration and loading it when such a popping cycle is desired by an operator. It will be understood that the example below simply illustrates an optimal set of popping cycles when using the popping machine 10 equipment described above and developed by the assignee of the current application, but further temperature curves and popping cycles based on other configurations can be developed for different machines and settings and can be programmed into the popping machine 10 as well.

With additional focus on FIG. 7, several important temperatures are pointed out where action typically needs to be taken by the popping machine 10 and/or the operator. One of these is the kernel load temperature (the "load point temperature") at the beginning of each popping cycle, with sample values of this load point temperature being 480° F. for mushroom salt and mushroom sweet; 405° F. for butterfly salt; and 400° F. for butterfly sweet. The next identification is the sugar load point for the two sweet modes (the "sweet point temperature"), which in these exemplary plots occurs at 340° F. at about 1:15 following the load of kernels for mushroom sweet; and at 290° F. at about 1:00 following the load of kernels for butterfly sweet. After a period of about 1:30 to 2:00 has passed, it is shown that the kettle 12 begins to heat back up again to approach the dump points which are shown at the terminal ends of the graphical plots of the temperature curves. In these exemplary plots, the dump point temperature and time are as follows: 362° F. and 2:56 for mushroom salt; 363° F. and 3:50 for mushroom sweet; 400° F. and 4:26 for butterfly salt; and 383° F. and 5:23 for butterfly sweet. The differences in time and temperature for these operator/machine events are based on butterfly type popcorn needing to cook for longer than mushroom type popcorn and based on sweet popcorn taking longer to cook as a result of additional cooling when the sugar is initially added. Of course, these set points defined by temperatures are just one example developed by the assignee of this application for use with the equipment described herein, and time values may be used for set points in other embodiments. It will also readily be understood why it is nearly impossible with so many different variations on types of popcorn to produce for an operator to optimally manage each different type of popping cycle, hence making the popping machine 10 and methods described herein advantageous in this field. These exemplary temperature curves are what define the predetermined temperature set points, so it will be appreciated that modifications in these optimal plots will also result in variations in the set points used during the operational flowcharts described herein.

In addition to accurately managing the popping and cooking of different types of popcorn kernels (with or without sweetened coatings), the popping machine 10 also advantageously provides prompts to an operator for adding sugar at the appropriate time to avoid burning of a sweetened coating in the popcorn popping cycle. Thus, for operators needing sweet popcorn on a regular basis for consumers, the operators will be able to properly manage optimal cooking of such sweet popcorn thanks to the additional functionality and features of this invention. In this regard, high-quality popcorn will be produced consistently when using the popping machine 10 and methods described herein.

What is claimed is:

1. A method of popping different types of popcorn kernels in a kettle of a popping machine which includes a controller communicating with a user interface and a heat sensor responsive to a temperature of the kettle, the method comprising:
    (a) determining, based upon a selection made by an operator at the user interface, a selected one of the different types of popcorn kernels to be popped in a first batch of kernels during a first popping cycle to produce a first popped popcorn type;
    (b) retrieving a first set of predetermined cooking temperature set points that is associated with cooking the selected one of the different types of popcorn kernels in the first batch of kernels, the first set of predetermined cooking temperature set points including at least a load point temperature and a dump point temperature, wherein the first set of predetermined cooking temperature set points is one of a plurality of stored sets of predetermined cooking temperature set points, which are stored for and associated with cooking different types of popcorn kernels in the kettle;
    (c) heating the kettle to the load point temperature;
    (d) alerting the operator to load the first batch of kernels into the kettle to begin the first popping cycle when the kettle reaches the load point temperature, as measured by the heat sensor;
    (e) heating the kettle to the dump point temperature to cook the first batch of kernels and generate popped popcorn of the first popped popcorn type; and
    (f) prompting for the popped popcorn to be dumped from the kettle when the kettle reaches the dump point temperature, as measured by the heat sensor.

2. The method of claim 1, wherein each of steps (d) and (f) comprises:
    providing at least one of an audible alarm and an illumination of an indicator light to identify the loading or dumping action required by the operator.

3. The method of claim 1, wherein step (a) further comprises:
    determining, based upon a selection made by the operator at the user interface, that a sweet mode is active for the first popping cycle such that the first popped popcorn type is to include a sweetened coating, wherein the sweet mode further requires addition of sugar during the first popping cycle to produce the sweetened coating,
    wherein retrieving the first set of predetermined cooking temperature set points at step (b) comprises retrieving a sweet point temperature which defines when the sugar is to be added during the first popping cycle when the sweet mode is active.

4. The method of claim 3, wherein when the sweet mode is active, the method further comprises, between steps (d) and (e):
    detecting when the kettle falls below the sweet point temperature as a result of cooling of the kettle caused by loading the first batch of kernels into the kettle; and alerting the operator to load the sugar into the kettle when the kettle falls below the sweet point temperature, so as to avoid burning the sugar in the kettle during the first popping cycle.

5. The method of claim 1, wherein retrieving the first set of predetermined cooking temperature set points at step (b) further comprises:
retrieving a cold point temperature for the first batch of kernels, the cold point temperature defining a threshold for determining whether the kettle was cold at an initial power up of the popping machine;
retrieving a coast point temperature for the first batch of kernels, the coast point temperature defining a threshold for turning off heat energy to the kettle as the kettle approaches the load point temperature after starting from a cold kettle;
retrieving a set point temperature for the first batch of kernels, the set point temperature defining a temperature that is to be maintained at the kettle;
retrieving the load point temperature for the first batch of kernels, the load point temperature defining when to add the first batch of kernels to the kettle;
retrieving the dump point temperature for the first batch of kernels, the dump point temperature defining when to dump popped popcorn from the kettle; and
retrieving a sweet point temperature for the first batch of kernels, the sweet point temperature defining when to add sugar to the kettle when a sweet mode is active.

6. The method of claim 5, further comprising:
determining, based upon a selection made by the operator at the user interface during the initial power up of the popping machine, whether an offset calibration mode is activated;
detecting a current operating mode of the popping machine based on the selected one of the different types of popcorn kernels; and
when the offset calibration mode is activated:
adjusting a dump offset added to the dump point temperature for the current operating mode based on input from the operator at the user interface; and
adjusting a sweet offset added to the sweet point temperature for the current operating mode based on input from the operator at the user interface,
wherein the dump offset and the sweet offset, respectively, enable operator adjustments to the dump point temperature and the sweet point temperature of the current operating mode based on operator preferences.

7. The method of claim 1, further comprising:
performing a kettle heat routine to determine whether to supply heat energy to the kettle at about every 1 second following an initial power up of the popping machine.

8. The method of claim 7, wherein the first set of predetermined cooking temperature set points includes a cold point temperature and a coast point temperature, and wherein performing the kettle heat routine further comprises:
determining whether the kettle was cold, as defined by being below the cold point temperature, at the initial power up of the popping machine; and
when it is determined that the kettle was cold at the initial power up of the popping machine:
heating the kettle to the coast point temperature; and
turning off heat energy applied to the kettle when the kettle reaches the coast point temperature to allow a continued rise of kettle temperature to about the load point temperature, so as to minimize overshoot beyond the load point temperature.

9. The method of claim 7, wherein the first set of predetermined cooking temperature set points includes a cold point temperature and a set point temperature, and wherein performing the kettle heat routine further comprises:
determining whether the kettle was cold, as defined by being below the cold point temperature, at the initial power up of the popping machine; and
when it is determined that the kettle was not cold at the initial power up of the popping machine:
turning on heat energy applied to the kettle when the kettle is below the set point temperature; and
turning off heat energy applied to the kettle when the kettle is above the set point temperature, thereby maintaining the kettle around the set point temperature.

10. The method of claim 1, further comprising:
performing an alarm routine to determine whether any alarms for the operator should be activated or deactivated at about every 1 second following an initial power up of the popping machine.

11. The method of claim 10, wherein performing the alarm routine further comprises:
determining whether the popping machine is in a load alarm mode or a dump alarm mode;
when the popping machine is in the load alarm mode, activating a load alarm to alert the operator to load the first batch of kernels into the kettle if the kettle is above the load point temperature, and then deactivating the load alarm when the kettle falls 15° F. below the load point temperature; and
when the popping machine is in the dump alarm mode, activating a dump alarm to alert the operator to dump popped popcorn from the kettle if the kettle is above the dump point temperature, and then deactivating the dump alarm after 10 seconds have passed following activation of the dump alarm,
wherein each of the load alarm and the dump alarm includes at least one of an audible alarm and illumination of an indicator light on the user interface.

12. The method of claim 11, wherein when the popping machine is in the load alarm mode, performing the alarm routine further comprises:
starting a dump block timer when the load alarm is deactivated, the dump block timer defining a period of time in which the alarm routine remains in the load alarm mode before returning to the dump alarm mode, thereby allowing time for cooking the first batch of kernels in the kettle.

13. The method of claim 12, wherein the first set of predetermined cooking temperature set points also includes a sweet point temperature, and wherein when the dump block timer is running in the load alarm mode, performing the alarm routine further comprises:
determining whether the kettle is below the sweet point temperature;
activating a sweet alarm to alert the operator to add sugar to the kettle when the kettle falls below the sweet point temperature; and
deactivating the sweet alarm after 10 seconds have passed following activation of the sweet alarm.

14. The method of claim 1, further comprising:
repeating steps (a) through (f) for a second batch of kernels in a second popping cycle to produce a second popped popcorn type, wherein the second batch of kernels includes a second selected one of the different types of popcorn kernels which is different from the first batch of kernels.

15. The method of claim 1, wherein the different types of popcorn kernels include at least one of a mushroom type popcorn and a butterfly type popcorn.

16. A method of popping sweet popcorn in a kettle of a popping machine which includes a controller communicating with a heat sensor responsive to a temperature of the kettle, the method comprising:
    (a) retrieving a set of predetermined cooking temperature set points associated with cooking the sweet popcorn, the set of predetermined cooking temperature set points including at least a load point temperature, a sweet point temperature, and a dump point temperature;
    (b) heating the kettle to the load point temperature;
    (c) alerting an operator of the popping machine to load a batch of popcorn kernels into the kettle to begin a popping cycle when the kettle reaches the load point temperature, as measured by the heat sensor;
    (d) detecting when the kettle falls below the sweet point temperature after the batch of popcorn kernels are loaded into the kettle at the load point temperature;
    (e) alerting the operator to load sugar into the kettle when the kettle falls below the sweet point temperature, as measured by the heat sensor, so as to avoid burning the sugar in the kettle;
    (f) heating the kettle to the dump point temperature to cook the batch of popcorn kernels and the sugar to generate a popped sweet popcorn; and
    (g) prompting for the popped sweet popcorn to be dumped from the kettle when the kettle reaches the dump point temperature, as measured by the heat sensor.

17. The method of claim 16, wherein each of steps (c), (e) and (g) comprises:
    providing at least one of an audible alarm and an illumination of an indicator light to identify the loading or dumping action required by the operator.

18. The method of claim 16, further comprising:
    performing an alarm routine to determine whether a sweet alarm for the operator should be activated or deactivated, wherein the alarm routine comprises:
        detecting that the kettle has fallen below the load point temperature by a predetermined temperature threshold, indicating that the batch of popcorn kernels has been loaded into the kettle and is reducing the temperature of the kettle accordingly;
        after detecting that the kettle has fallen below the load point temperature by the predetermined temperature threshold, determining whether the kettle has fallen below the sweet point temperature;
        activating a sweet alarm when the kettle falls below the sweet point temperature to complete the alerting of the operator in step (e); and
        deactivating the sweet alarm after a predetermined time lapse has passed following activation of the sweet alarm.

19. The method of claim 18, wherein the predetermined temperature threshold is 15° F. below the load point temperature, and wherein the predetermined time lapse is 10 seconds.

20. The method of claim 16, further comprising:
    determining, based upon a selection made by the operator at a user interface during an initial power up of the popping machine, whether an offset calibration mode is activated; and
    when the offset calibration mode is activated, adjusting a sweet offset added to the sweet point temperature based on operator input at the user interface,
    wherein the sweet offset enables operator adjustments to the sweet point temperature based on operator preferences.

* * * * *